United States Patent
Netter et al.

(10) Patent No.: US 11,218,066 B2
(45) Date of Patent: Jan. 4, 2022

(54) APPARATUS AND METHOD FOR A ROTATION ANGLE DETECTOR

(71) Applicant: Thomas Netter, Winterthur (CH)

(72) Inventors: Thomas Netter, Winterthur (CH); Patric Luethi, Zollikon (CH)

(*) Notice: Subject to any disclaimer, the term of this patent is extended or adjusted under 35 U.S.C. 154(b) by 98 days.

(21) Appl. No.: 16/819,065

(22) Filed: Mar. 14, 2020

(65) Prior Publication Data
US 2020/0295644 A1    Sep. 17, 2020

(30) Foreign Application Priority Data
Mar. 15, 2019  (WO) .................. PCT/IB2019/052111

(51) Int. Cl.
| | |
|---|---|
| *H02K 1/16* | (2006.01) |
| *H02K 1/14* | (2006.01) |
| *H02K 24/00* | (2006.01) |
| *G01D 5/20* | (2006.01) |
| *H02K 5/10* | (2006.01) |

(52) U.S. Cl.
CPC .......... *H02K 24/00* (2013.01); *G01D 5/2046* (2013.01); *H02K 5/10* (2013.01); *H02K 2213/03* (2013.01)

(58) Field of Classification Search
CPC ...... H02K 24/00; H02K 5/10; H02K 2213/03; G01D 5/2046; G01B 7/30; G01B 11/26; H02P 6/16; H02P 21/32; H02P 2203/03
See application file for complete search history.

(56) References Cited

U.S. PATENT DOCUMENTS

| | | | |
|---|---|---|---|
| 4,966,336 A * | 10/1990 | Humble ................. | A01K 89/05 242/295 |
| 6,676,296 B2 * | 1/2004 | Inoue ..................... | F16C 33/20 384/276 |
| 2013/0223775 A1 * | 8/2013 | Suzuki .................. | F16C 17/022 384/286 |

* cited by examiner

*Primary Examiner* — Alesa Allgood

(57) ABSTRACT

An apparatus for detecting a rotation angle, comprising: an annular stator around an axis of revolution Z, comprising: at least a first pole, a second pole, and a third pole arranged at constant azimuthal intervals around the axis of revolution of the annular stator, each of the poles comprising one or more electrical windings, and each of the poles comprising a flange that is a portion of a first surface of revolution around the annular stator's axis of revolution, the flange having an area distribution substantially that, within a coordinate system, of a $\sin(\alpha)$ function from a low $\alpha$ bound of about 0 radians to a high $\alpha$ bound of about $\pi$ radians. The apparatus may comprise a rotor that comprises sectors having the azimuthal extent of one flange and having different magnetic permeabilities. Methods for forming the apparatus and for obtaining measurements are also presented.

20 Claims, 10 Drawing Sheets

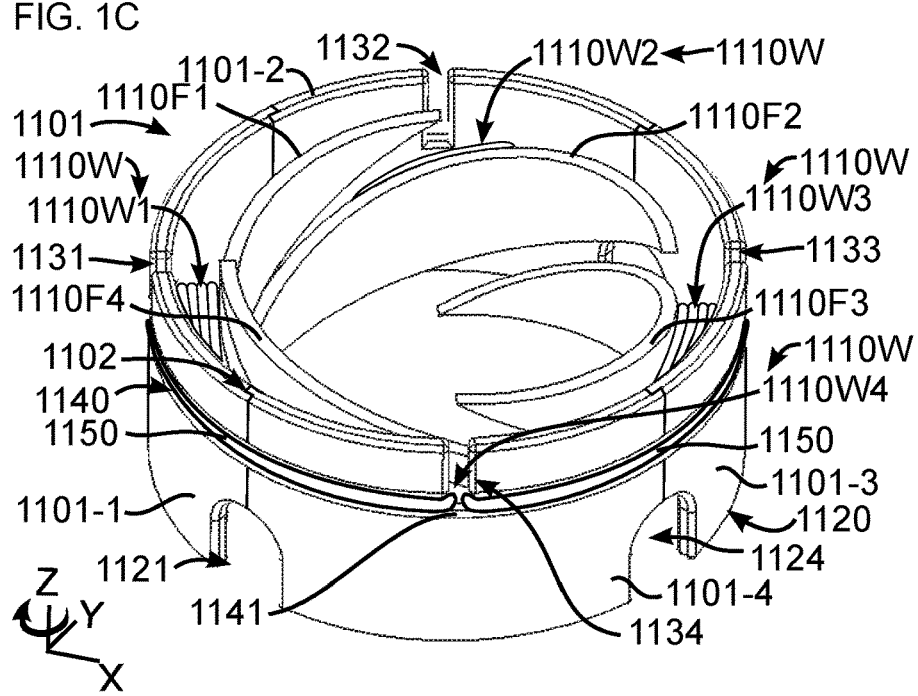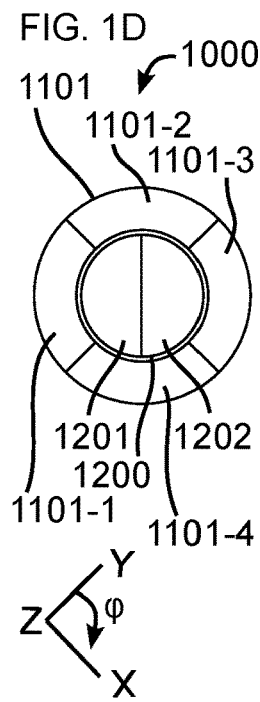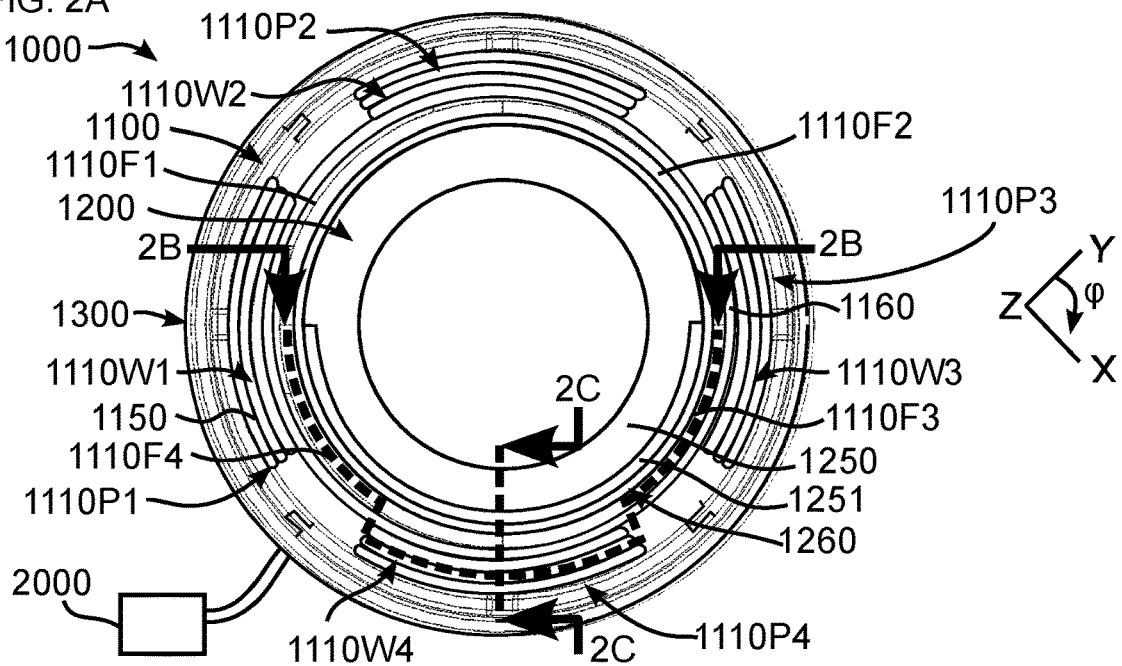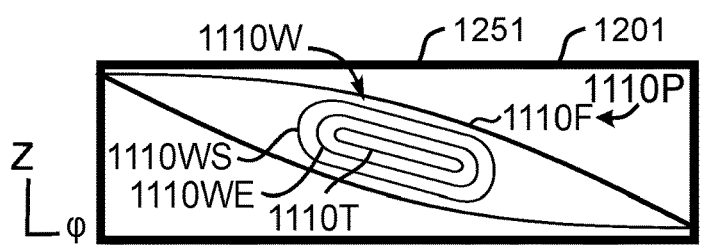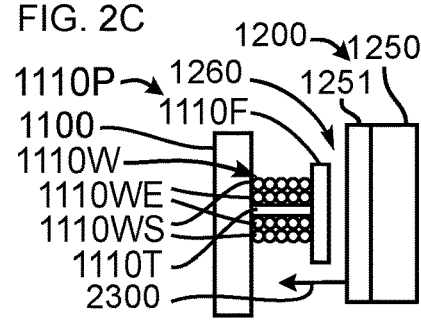

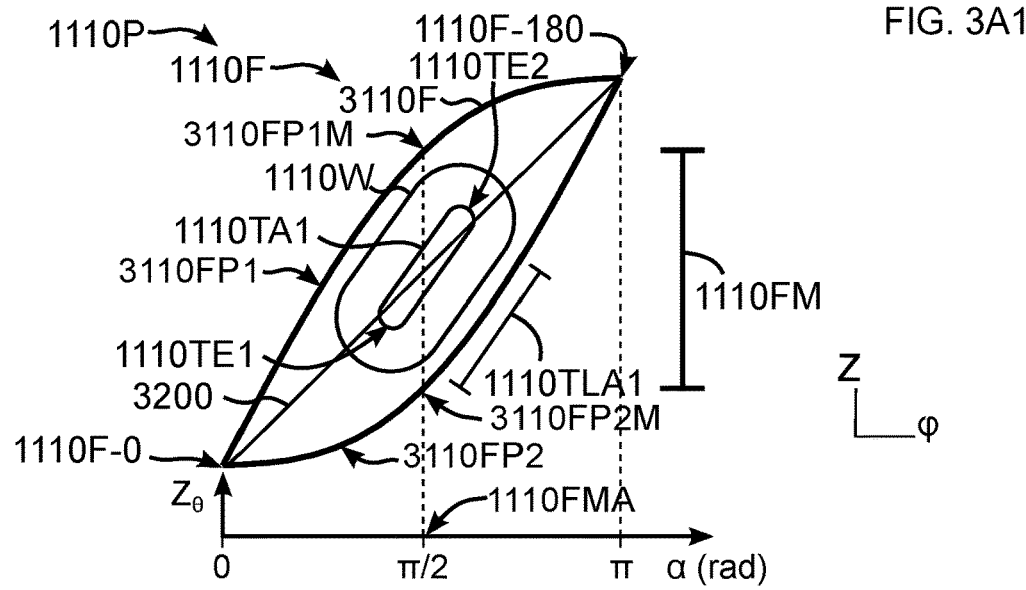
FIG. 3A1
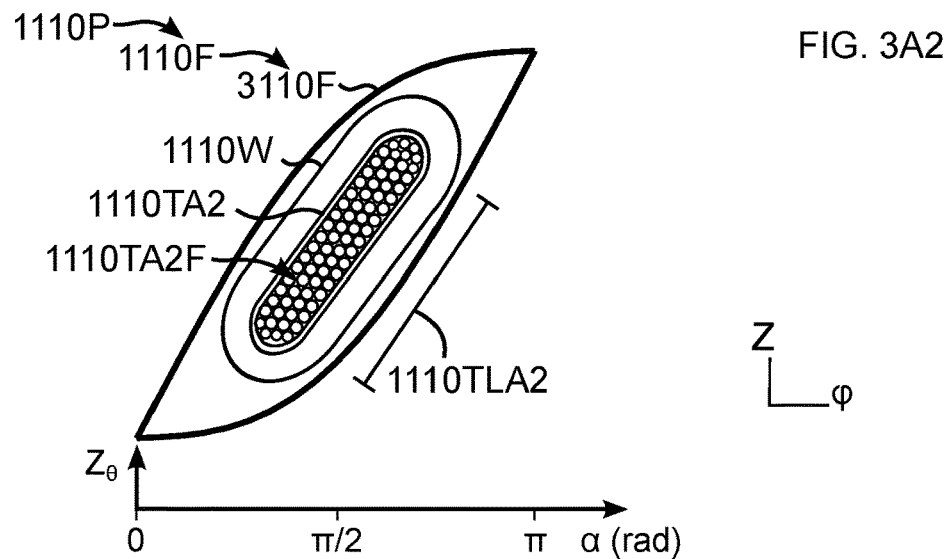
FIG. 3A2
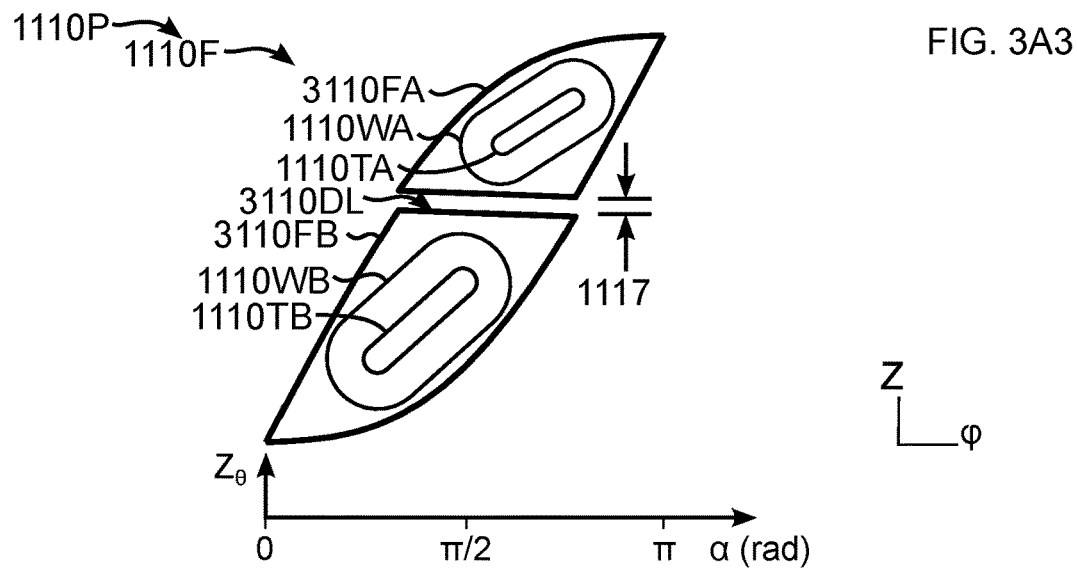
FIG. 3A3

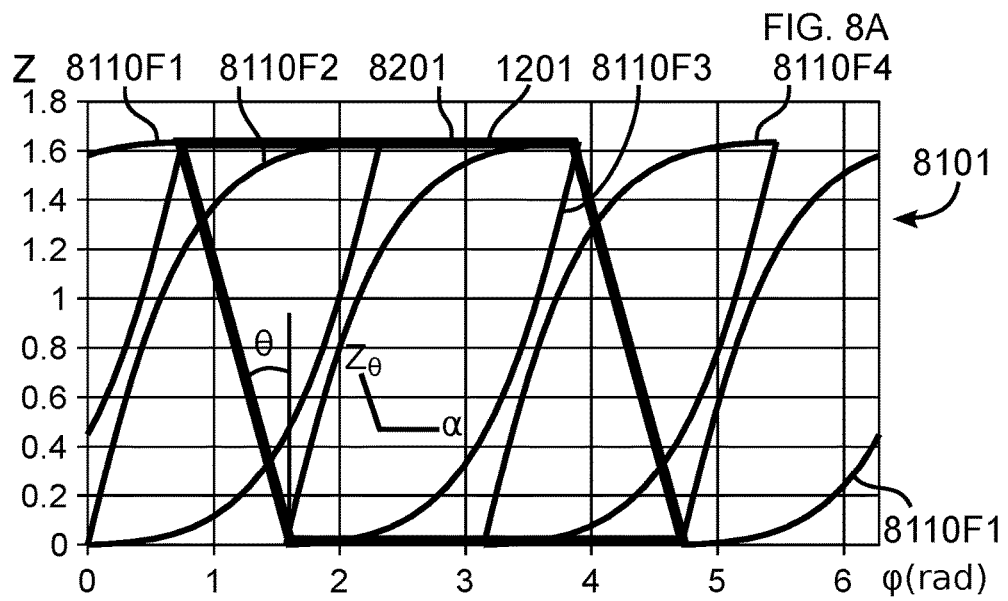
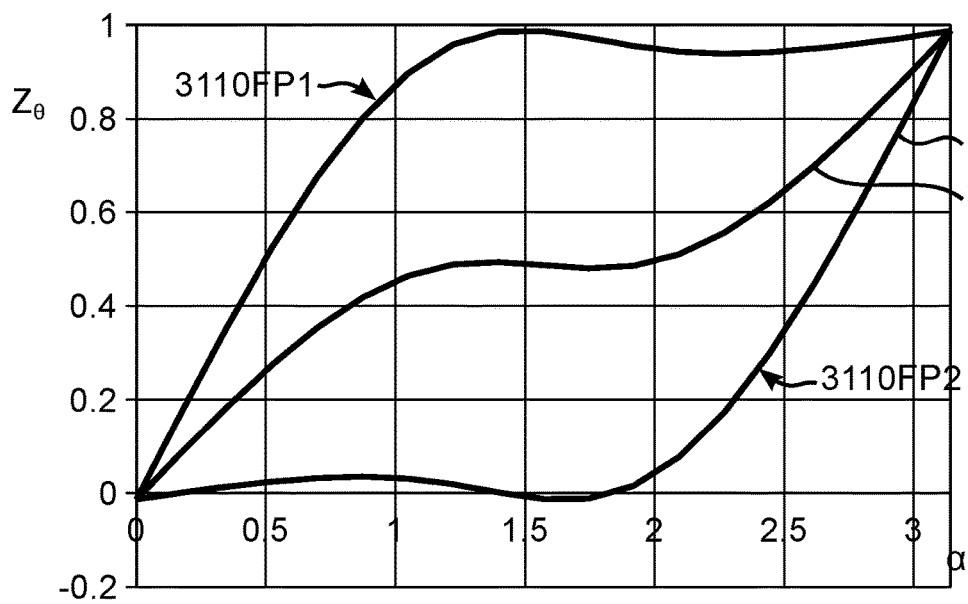
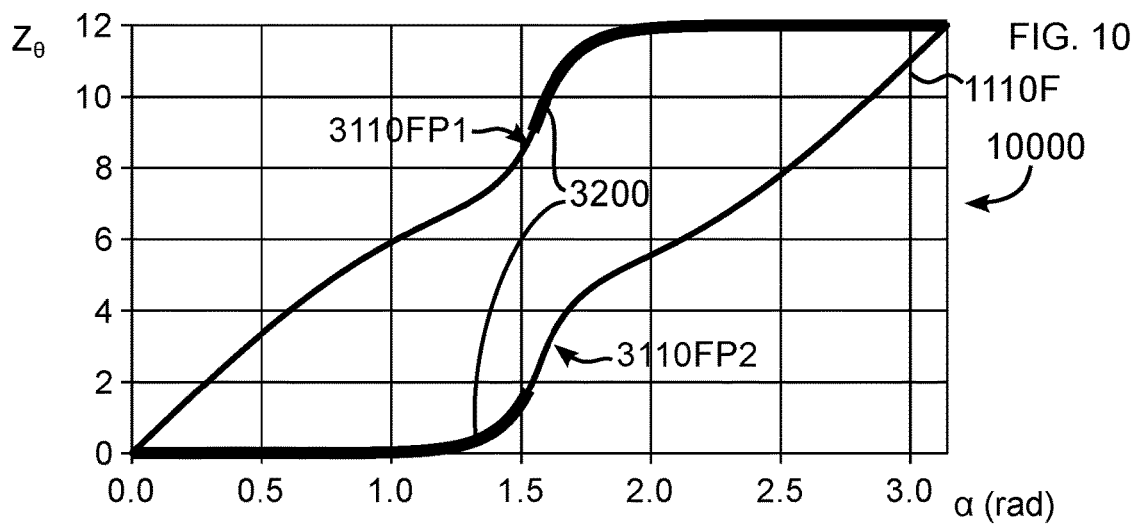

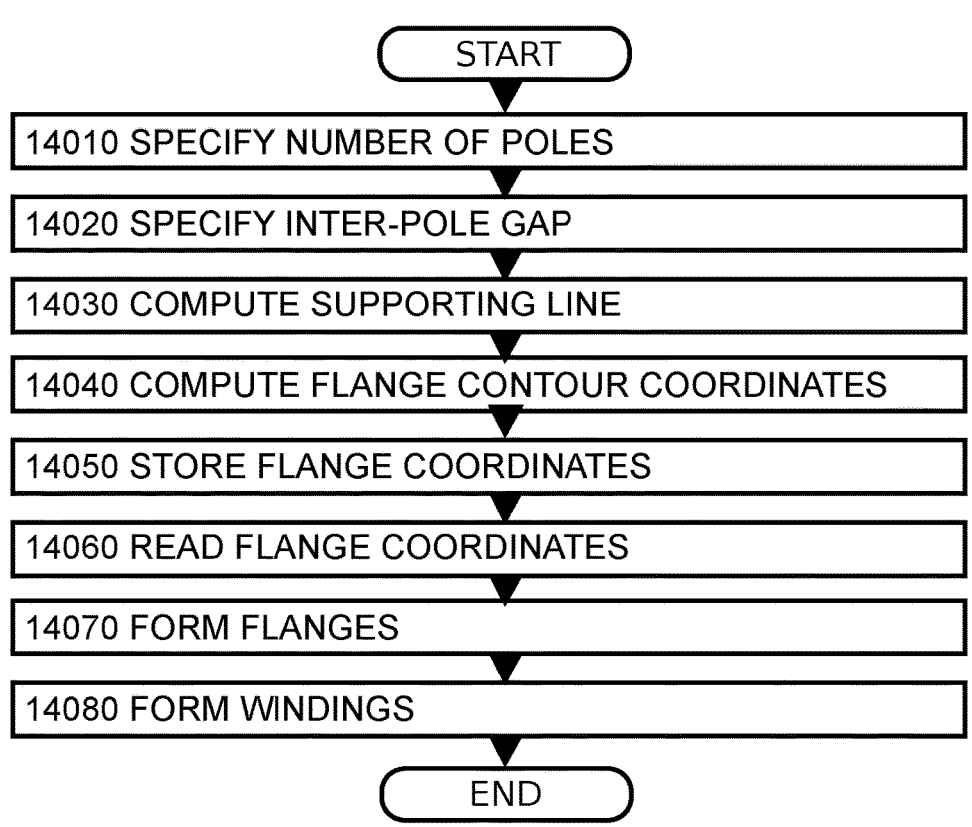
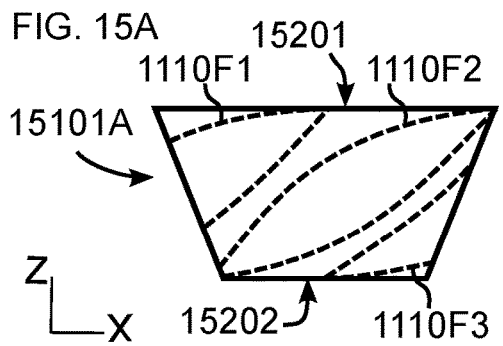
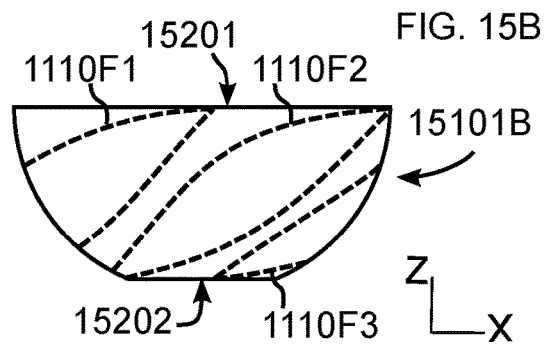
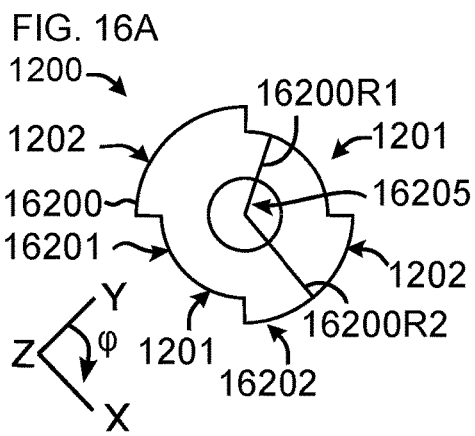
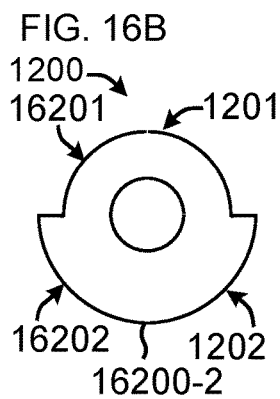
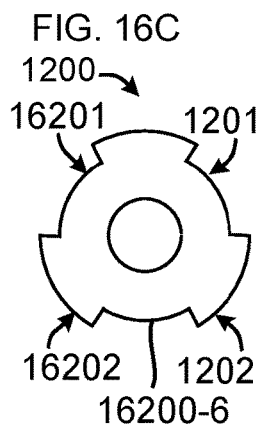

17000

19000

APPARATUS AND METHOD FOR A ROTATION ANGLE DETECTOR

FIELD

The present disclosure relates to resolvers, and in particular to pole and flange arrangements on resolver stators.

BACKGROUND

A resolver is an electromagnetic device for detecting a rotation angle. Resolvers are used, for example, as sensors for: monitoring and regulating electric motors, for example in hybrid or electric vehicles; controlling aircraft and spacecraft actuators and regulating turbines; and sensing and regulating industrial automation and robotic actuators and drives. A resolver comprises one or more stators surrounding one or more rotors. In some embodiments of a resolver, the stator comprises a plurality of components to generate an electromagnetic flux or measure magnetic flux variations induced by the rotor's azimuthal orientation. For example, the stator comprises one or more excitatory windings and one or more sensory windings, for example wound around a plurality of metallic teeth or cores arranged circumferentially around the rotor. The shape of the teeth, for example of their surface or flange facing the rotor, contributes to the angular measurement's accuracy and precision. There is a need for resolvers that feed highly accurate signals, for example to analog-to-digital circuits, for example resolver-to-digital converter circuits.

SUMMARY

The disclosure describes embodiments of an apparatus for detecting a rotation angle, comprising: an annular stator around an axis of revolution Z, comprising: at least a first pole, a second pole, and a third pole arranged at constant azimuthal intervals around the axis of revolution of the annular stator, each of the poles comprising one or more electrical windings, and each of the poles comprising a flange that is a portion of a first surface of revolution around the annular stator's axis of revolution, the flange having an area distribution substantially that, within a coordinate system, of a $\sin(\alpha)$ function from a low $\alpha$ bound of about 0 radians to a high $\alpha$ bound of about $\pi$ radians. In an embodiment of the apparatus, a first subset of the poles comprises a sine sensory winding line and a second remaining subset of poles comprises a cosine sensory winding line. For example, each pole comprises one or more excitatory windings coaxial with one or more sensory windings. In some embodiments of the apparatus, one or more of the pole's flanges is delineated by at least the lines defined by: from $\alpha=0$ to $\alpha=\pi/2$ radians: $z_\theta=0$ and $z_\theta=\sin(\alpha)$, and from $\alpha=\pi/2$ to $\alpha=\pi$ radians: $z_\theta=1-\sin(\alpha)$ and $z_\theta=1$. In some embodiments, a high $\alpha$ bound of the first pole's flange and a low $\alpha$ bound of the third pole's flange are aligned with the $\alpha=\pi/2$ abscissa of the second pole's flange's contours. For example, the annular stator comprises four poles. In an embodiment of the apparatus, the flange is sheared by a shear angle $\theta$ within a range $[-\pi/4, \pi/4]$ radians with respect to a radial projection of the axis of revolution Z onto the first surface of revolution. In some embodiments, the annular stator comprises one or more grooves into an external perimeter of the annular stator, each groove comprising one or more winding wires of one or more electrical windings. Embodiments of the apparatus for detecting a rotation angle comprise, for example, a rotor. For example, an embodiment of the apparatus comprises a rotor that comprises a first rotor sector having a magnetic permeability that is different from that of an azimuthally adjacent second rotor sector and wherein the first rotor sector has an azimuthal extent that is about an azimuthal extent of one flange. An embodiment of the apparatus comprises, for example, a rotor that comprises a first rotor sector comprising one or more strata of a material of magnetic permeability that is different from the magnetic permeability of material in an azimuthally-adjacent rotor sector. In an embodiment of the apparatus, within the span of the flange projected along the axis of revolution Z, the flange masks the one or more electrical windings from the radial line-of-sight of the axis of revolution Z. In some embodiments, the stator is an assembly of a plurality of stator sector components. In an embodiment, for example, one or more of the first pole, the second pole, and the third pole comprise a hollow tooth. In an embodiment further comprising a rotor, the rotor is, for example, characterized as having a first sector having a first magnetic permeability and a second sector having a second magnetic permeability that is different from the first magnetic permeability. For example, an embodiment of the apparatus further comprises a rotor that comprises one or more layers made of one or more non-magnetizable metals over a sector of azimuthal span corresponding the azimuthal extent of one flange. In further example, an embodiment of the apparatus further comprises a rotor that comprises one or more layers that comprise copper.

The disclosure describes a method for forming an apparatus for detecting a rotation angle comprising an annular stator around an axis of revolution Z, comprising: forming, in an additive three-dimensional process, at least a first pole, a second pole, and a third pole arranged at constant azimuthal intervals around the axis of revolution of the annular stator, and each of the poles comprising a flange that is a portion of a first surface of revolution around the annular stator's axis of revolution, the flange having an area distribution substantially that, within a coordinate system $(\alpha; Z_\theta)$, of a $\sin(\alpha)$ function from a low $\alpha$ bound of about 0 radians to a high $\alpha$ bound of about $\pi$ radians. An embodiment of the method further comprises forming one or more electrical windings onto each pole.

The disclosure describes a method for measuring a rotation angle, comprising: acquiring one or more signals from one or more electrical windings of an annular stator around an axis of revolution Z, the annular stator comprising: at least a first pole, a second pole, and a third pole arranged at constant azimuthal intervals around the axis of revolution of the annular stator, each of the poles comprising one or more electrical windings, and each of the poles comprising a flange that is a portion of a first surface of revolution around the annular stator's axis of revolution, the flange having an area distribution substantially that, within a coordinate system $(\alpha; Z_\theta)$, of a $\sin(\alpha)$ function from a low $\alpha$ bound of about 0 radians to a high $\alpha$ bound of about $\pi$ radians.

BRIEF DESCRIPTION OF DRAWINGS

FIG. 1C presents a perspective view of an embodiment of a stator ring.

FIG. 1D presents a top view map of stator and rotor sectors.

FIG. 2A presents a top view of a resolver embodiment.

FIG. 2B presents a planar mapping of a stator's pole.

FIG. 2C presents a radial cross-section from the stator ring to the rotor.

FIGS. 3A1, 3A2, 3A3 present different embodiments of a pole's flange.

FIGS. 6, 7, 8A present alternative layout embodiments for a set of flanges.

FIG. 8B is a perspective view of a rotor comprising a parallelogram-shaped layer.

FIGS. 9, 10 present alternative embodiments for a stator flange.

FIG. 14 presents a method for manufacturing a stator.

FIGS. 15A, 15B present side views of stator embodiments.

FIGS. 16A, 16B, 16C present cross-sections of multi-radius rotors.

DESCRIPTION OF EMBODIMENTS

Figure 1A:
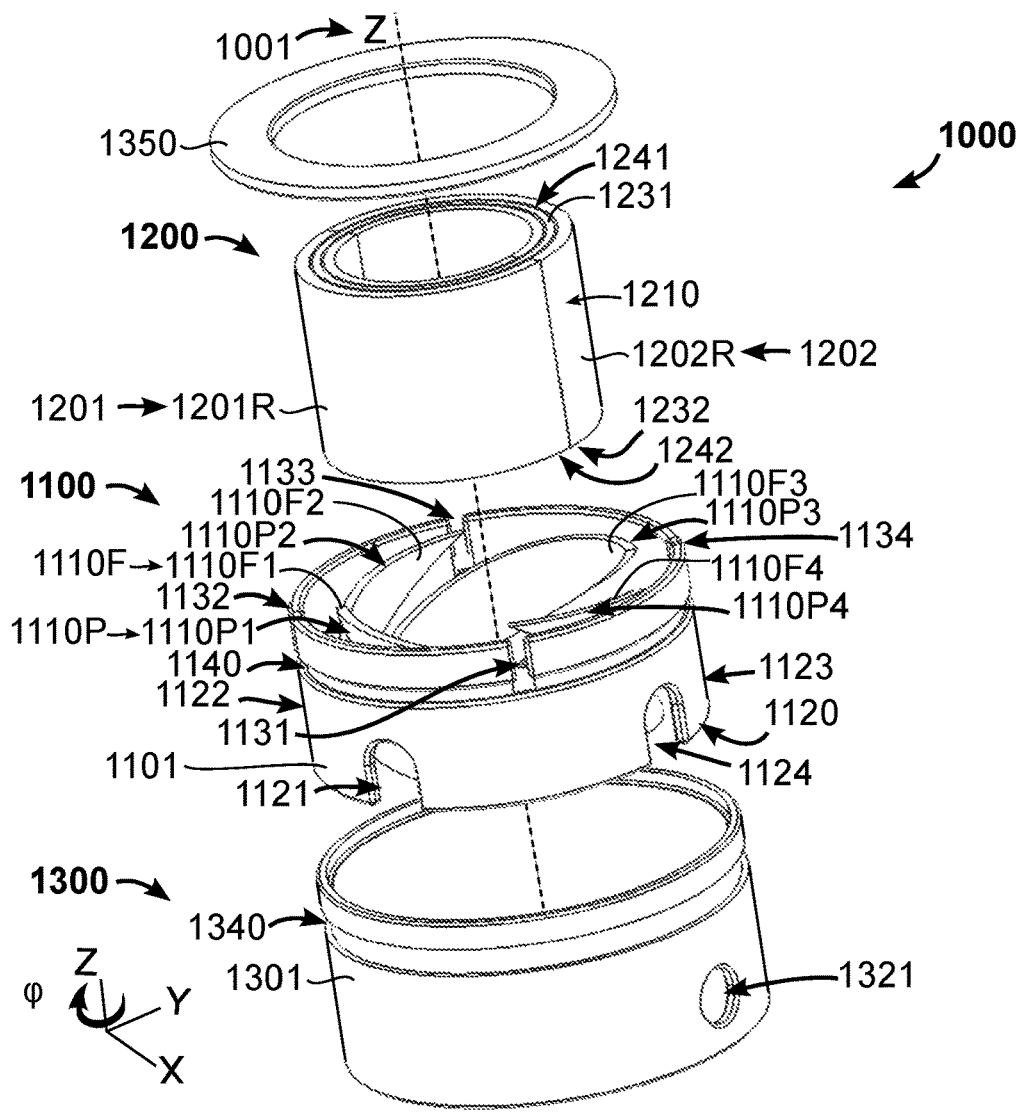
FIG. 1A is an exploded perspective view of an embodiment of a resolver assembly.
Figure 1B:
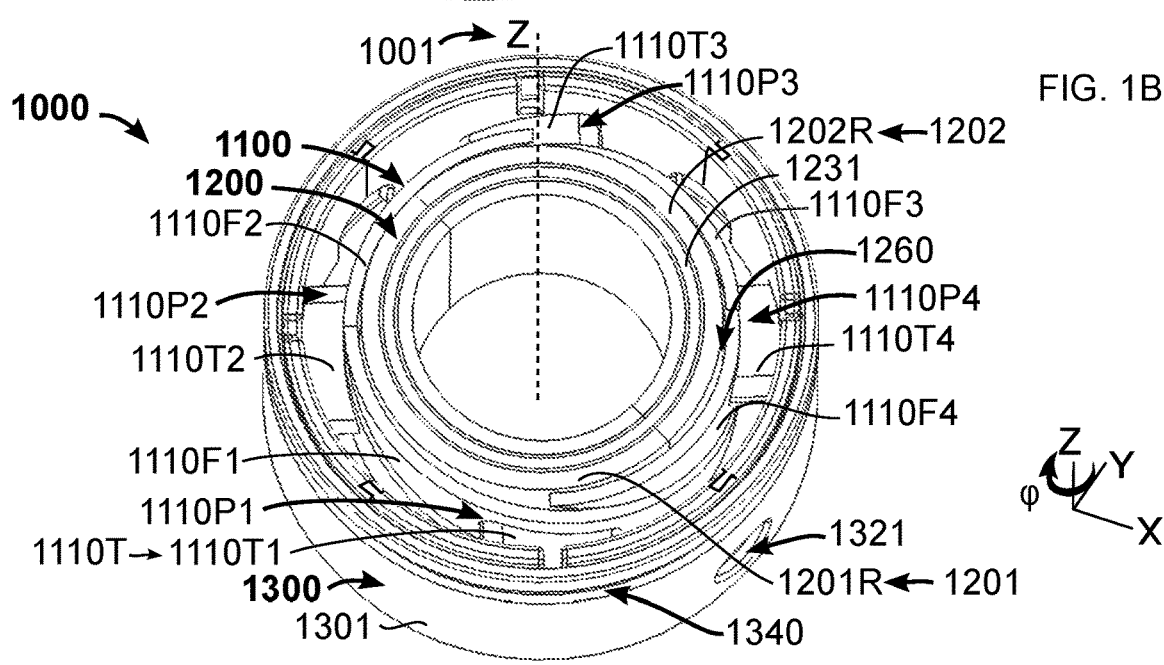
FIG. 1B is a perspective view of the resolver assembly of FIG. 1A.

FIG. 1A is an exploded view of an embodiment of a resolver assembly 1000. A resolver is a type of rotation angle detector. FIG. 1B is an assembled view (excluding enclosure lid 1350) of the resolver assembly 1000 of FIG. 1A. The resolver assembly 1000 comprises an embodiment of a stator 1100, an embodiment of a rotor 1200, and an embodiment of an enclosure 1300.

A resolver is, for example, a rotary variable differential transformer (RVDT). A resolver comprises, for example, a primary winding, for example an excitatory winding 13101, 12500, and one or more secondary or sensory windings 13110, 13120. The sensory windings 13110, 13120 are, for example, arranged circumferentially on poles 1110P within the stator 1100. The sensory windings are, for example, each separated from the rotor 1200 by a flange 1110F. When the excitatory winding 13110, 13120 is supplied with alternating current it generates a magnetic field within the resolver. The flange 1110F transfers the magnetic field to the rotor 1200 which in turn transfers the magnetic field to other flanges 1110F. One or more factors affect how the flange 1110F interacts with the magnetic field, for example: the shape of the flange 1110F, for example the curves characterizing its contour; the surfacial extent of the flange, for example how it masks its corresponding windings from the rotor's radial line-of-sight 2300; the gap 1115 between flanges, for example in an azimuthal direction; progression of the radially-projected overlap between a sector 1201, 1202 of the rotor 1200 and the flange 1110F as the rotor 1200 spans a range of azimuthal positions; and relative position of flanges with respect to each other, for example the relative position of a flange's position of maximum extent 1110FM with respect to the tips 1110E-0, 1110E-180 of neighboring flanges in view of the geometry of the rotor's sectors 1201, 1202.

The stator 1100 comprises, for example, a stator ring 1101. The stator ring 1101 is, for example, cylindrical. The stator ring 1101 functions, for example, as a chassis for the stator's components. The stator ring 1101 comprises, for example, a magnetic core material. Magnetic core materials comprise, for example, one or more of: a ferromagnetic material; a ferrimagnetic compound material; a ferrite ceramic; a soft iron; a powdered metal; a powder iron; a vitreous metal; a carbonyl iron; a silicon iron alloy, for example 1.0844 (FeSi3) alloy; a silicon steel, for example laminated silicon steel; a mu-metal; a permalloy; a supermalloy; a Heusler alloy; a material comprising nickel, for example comprising one or more of: a 1.3921 (FeNi50) alloy, and a FeNi80 alloy; a steel alloy, for example a maraging steel, for example a martensite, for example 1.2709 steel; an austenistic stainless steel, for example 1.4404 steel; a material comprising one or more of magnesium, manganese, and cobalt elements; an yttrium-based material, for example yttrium iron garnet; and a material comprising one or more of chrome, chromium oxide, gadolinium, terbium, dysprosium, and europium elements. A component comprising magnetic core material is formed by one or more methods, for example one or more of casting, milling, laminating, plating, heat treating, plating, electroplating, powder pressing, and one or more additive manufacturing methods comprising, for example, sintering, selective laser sintering (SLS), selective laser melting (SLM), direct metal laser sintering (DMLS), and laser power bed fusion (LPBF).

The stator 1100 comprises in one embodiment a plurality of poles 1110P, for example at least a first pole 1110P1, a second pole 1110P2, and a third pole 1110P3 that are arranged circumferentially, for example at constant intervals, around an axis of revolution 1001 of the stator 1100 or of the rotor 1200. For example, the embodiment of the stator 1100 comprises four poles 1110P, for example further comprising a fourth pole 1110P4. In some embodiments for a stator 1100, the number of poles 1110P is, for example, greater than 4, for example in a range from 5 to 100, for example from 5 to 20, for example from 5 to 12. In some embodiments for a stator 1100, the poles 1110P are not arranged at constant intervals around the axis of revolution 1001. Each pole 1110P1, 1110P2, 1110P3, 1110P4 comprises one or more inwardly projecting teeth 1110T, for example a first tooth 1110T1, a second tooth 1110T2, a third tooth 1110T3, and a fourth tooth 1110T4 (FIG. 1B), respectively. The one or more poles 1110P1, 1110P2, 1110P3, 1110P4 comprise, for example, one or more flanges 1110F, for example flanges 1110F1, 1110F2, 1110F3, 1110F4, respectively. Each flange is, for example, mounted at the inward extremity of one or more teeth. For example, the stator embodiment depicted in FIGS. 1A, 1B, 1C, 2A comprises four poles 1110P, each pole comprises one tooth, and one flange is mounted at the inward extremity of each tooth. In some embodiments for a stator 1100, one or more poles 1110P comprise, for example, two, three, or more teeth 1110T. In some embodiments for a stator 1100, each flange 1110F is mounted at the extremity of one tooth. In some embodiments for a stator 1100, a flange 1110F is mounted at the extremities of a plurality of teeth 1110T, for example joining the plurality of teeth 1110T of a given pole 1110P. In some embodiments for a stator 1100, one or more flange portions 3110FA, 3110FB of a given pole 1110P are mounted at the extremities of one or more teeth 1110TA, 1110TB (FIG. 3A3).

An embodiment of the stator 1100, for example of the stator ring 1101, comprises, for example, one or more pass-through cutouts 1121, 1122, 1123, 1124, for example U-shaped pass-throughs, for example as many pass-through cutouts as the stator has poles. Each pass-through is, for example, located at a constant azimuthal position with respect to that of its respective pole. The width in the azimuthal direction of one or more of the pass-through cutouts is, for example, dimensioned to enable, for example, 6 wires, for example sheathed wires, to pass through and is, for example, from 0.1 mm to 20 mm wide, for example from 1 mm to 5 mm wide. For example, for an embodiment of a 4-pole stator, the pass-throughs are located pairwise diametrically opposite of each other, as shown in FIGS. 1A and 1B. In one embodiment, one or more pass-throughs extend in the Z-direction from a base 1120 of the stator 1100.

Figure 18:
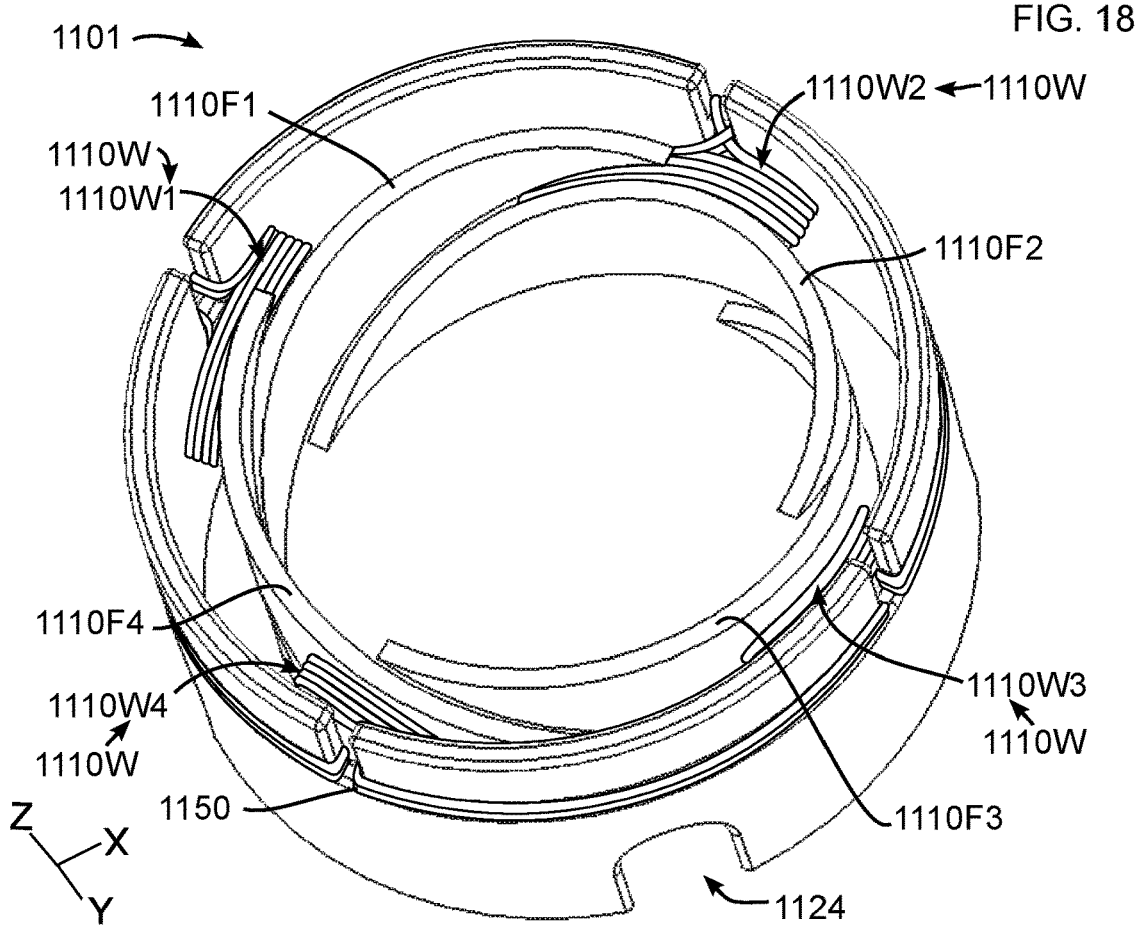
FIG. 18 presents a view of the embodiment of FIG. 1C under a different perspective.

FIG. 1C and FIG. 18 present a perspective view of an embodiment of a stator ring 1101 that comprises, for example, one or more notches or cutouts 1131, 1132, 1133, 1134. The notches 1131, 1132, 1133, 1134 provide an opening to pass one or more winding wires 1150 from a first pole to a second pole via one or more winding wire grooves 1140 into the perimeter, for example the external perimeter, of the stator ring 1101. The stator ring 1101 comprises one or more grooves 1140 into the external perimeter of the stator ring 1101, each groove comprising one or more winding wires 1150 of one or more electrical windings 1110W (shown as windings 1110W1, 1110W2, 1110W3, 1110W4). Passing one or more winding wires 1150 into the winding wire grooves 1140 located at the external perimeter of the stator ring 1101 provides a method to shield the winding wires 1150, for example of winding lines 13101, 13110, 13120 (FIGS. 13A, 13B) from electromagnetic radiation generated within the enclosure formed by the stator ring 1101. In some embodiments, for example the embodiment of FIG. 1C, each winding wire groove 1140 comprises one or more groove layers 1141 between the stator ring 1101 and the winding wire 1150. The wire used to form the windings 1110W is, for example, a copper wire with a circular cross section. An alternative embodiment for the wire used to form the windings 1110W is, for example, wire with a rectangular cross-section, for example comprising a copper layer on a flexible printed circuit board. The groove layer 1141 comprises, for example, a coating or a foil, for example comprising one or more of: a polymer, for example comprising one or more of a silicon, for example a silicon-based paint, for example a paint that resists temperatures in a range from 400° C. to 1000° C., an aramid, and a polyimide; a glass, for example fiberglass; and a cellulose, for example paper. The groove layer 1141 provides a method to pad and protect the winding wire 1150 against strain resulting, for example, from thermal expansion, and wear or chafing, for example resulting from vibrations.

In the embodiment presented in FIG. 1C, the stator 1100 comprises, for example, a plurality of portions of the stator ring 1101, for example stator ring sectors 1101-1, 1101-2, 1101-3, 1101-4. FIG. 1D presents a top view map of the stator sectors 1101-1, 1101-2, 1101-3, 1101-4 and the rotor sectors 1201, 1202 (for example of rotor sector components 1201R, 1202R shown in FIG. 1B) of a resolver 1000 that comprises four poles. The stator ring portions are, for example, all equal in azimuthal extent, for example all equal in shape. The stator ring portions sectors are, for example, fastened together by one or more of: a fastening ring; a retaining ring; and a dovetail joint 1102. Forming the stator ring 1101 from a plurality of stator ring portions provides, for example, a method to form the stator ring 1101 within a volume wherein one or more dimensions are inferior to that needed to manufacture a stator ring of full revolution. For example, an additive manufacturing method to form a stator 1000 comprises simultaneously forming a plurality of stator ring portions within the working zone of an additive manufacturing system.

FIGS. 1A, 1B present an embodiment of a rotor 1200 that is, for example, concentric with the axis 1001 of the stator 1100. In the embodiment of FIGS. 1A, 1B, the rotor 1200 comprises, for example, a first rotor sector 1201 and a second rotor sector 1202 (FIG. 1D), for example corresponding to rotor components 1201R and 1202R, respectively. In an embodiment of a resolver 1000 comprising a stator that comprises three or more poles 1110P, for example four poles 1110P1, 1110P2, 1110P3, 1110P4, positioned at regular azimuthal intervals, the rotor comprises, for example, two rotor sectors 1201, 1202 that each span 180° azimuthally. Other embodiments of the resolver 1000, for example comprising a stator that comprises more than 4 poles, comprise for example a rotor wherein a rotor sector, for example one or more rotor sectors 1201, 1202, spans the azimuthal extent of one stator flange 1110F1, 1110F2, 1110F3, 1110F4. In the embodiment presented in FIGS. 1A, 1B, 1C, 1D, the rotor sectors 1201, 1202 are, for example, two diametrically opposed components 1201R, 1202R. For example, the first rotor sector 1201 has, at a given electromagnetic field intensity and frequency, a magnetic permeability that is different from that of the second rotor sector 1202. In some embodiments, for example, the first rotor sector 1201 comprises material that has a magnetic relative permeability that is different, for example by a margin of at least 2%, from the magnetic relative permeability of all or part of the material comprised in the second rotor sector 1202. For example, magnetic permeability is said to be different between a first and a second component if it differs by a margin of at least 2%. The material extends, for example with a uniform distribution, over the rotor sector's azimuthal extent. For example, the first rotor sector 1201 comprises a ferritic steel and the second rotor sector 1202 comprises an austenitic steel. For example, the first rotor sector 1201 comprises 1.2709 steel and the second rotor sector 1202 comprises 1.4305 or grade 303 steel. In the embodiment of FIGS. 1A, 1B, the rotor components 1201R, 1202R are fastened together, for example by one or more fasteners, for example by one or more rotor retaining rings 1231, 1232, for example inserted into one or more retaining ring grooves 1241, 1242, for example located at each axial-wise (Z-axis) end of the rotor 1200. Other fastening methods, for example as described for the stator 1100, are, for example, also used to fasten two or more rotor components 1201R, 1202R.

FIG. 2A presents a top view of a resolver embodiment 1000. FIG. 2A presents an embodiment of a stator 1100 comprising one or more winding assemblies 1110W1, 1110W2, 1110W3, 1110W4 formed of one or more winding wires 1150 wound around one or more pole teeth 1110T1, 1110T2, 1110T3, 1110T4 shown in FIG. 1B. The rotor embodiment 1200 of FIG. 2A differs from that of FIGS. 1A and 1B? in that it comprises a rotor core 1250 that extends over the entire azimuthal span. The rotor core 1250 further comprises, for example, a sector of azimuthal span corresponding, for example, to the azimuthal extent of one flange 1110F or pole 1110P, comprising one or more rotor layers or strata 1251, the magnetic relative permeability of which is different from the relative permeability of the rotor core 1250. In FIG. 2A, the rotor layer 1251 is presented, for example, located at the circumferential surface of the rotor core 1250, for example spanning a hemi-circumferential surface of the rotor. Other embodiments comprise, for example, a rotor layer 1251 embedded as a strata within the rotor core 1250 or rotor components 1201R, 1202R, for example at constant radius. In some embodiments, the rotor layer 1251 comprises, for example, one or more of: a sheet of layer material; a mesh of layer material, for example as a grid or as an array of dots; and a coating of layer material. In some embodiments, the layer material comprises, for example, a magnetic core material having a relative permeability that is different from that of the material used for the rotor surface that does not comprise the layer material, for example the material forming the rotor core 1250. In some embodiments, the layer material comprises, for example, one or more of: a non-magnetizable metal, for example copper or a metal comprising copper; a paramagnetic material; an austenistic steel, for example austenistic stainless steel; aluminum; and platinum. Conversely, an alternative embodiment of the rotor 1200 comprises a rotor core 1250 that is, for example, of a non-magnetic material, for example a polymer, and the rotor comprises a rotor layer 1251 of material that is magnetic, for example a paint or a layer comprising one or more of: iron particles; a ferrimagnetic material; and zinc.

Figure 13A:
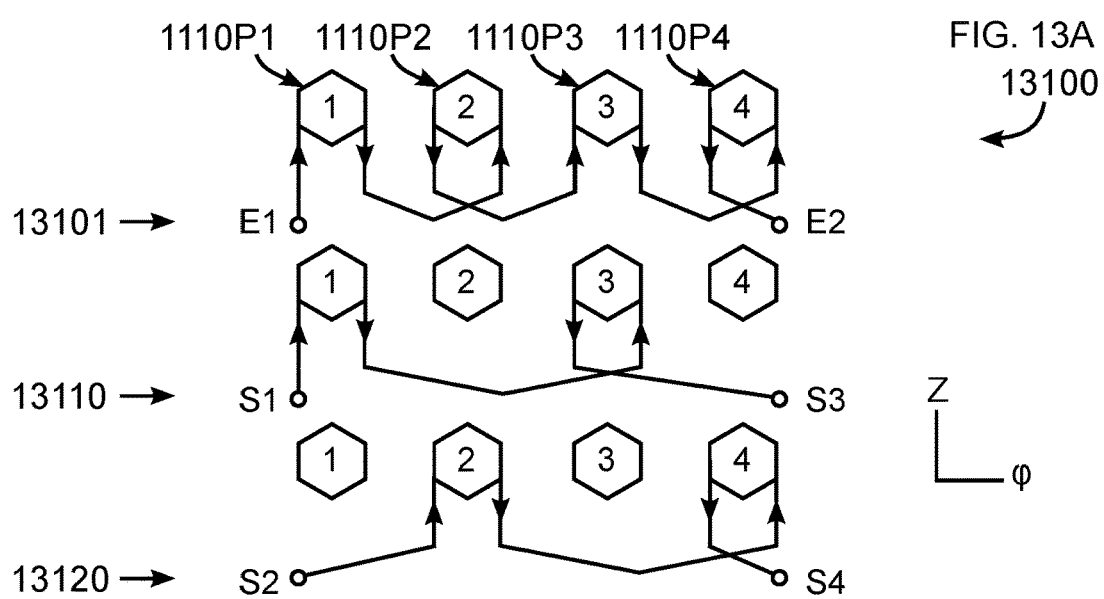
FIGS. 13A, 13B present two winding assembly embodiments for two types of resolvers.
Figure 13B:
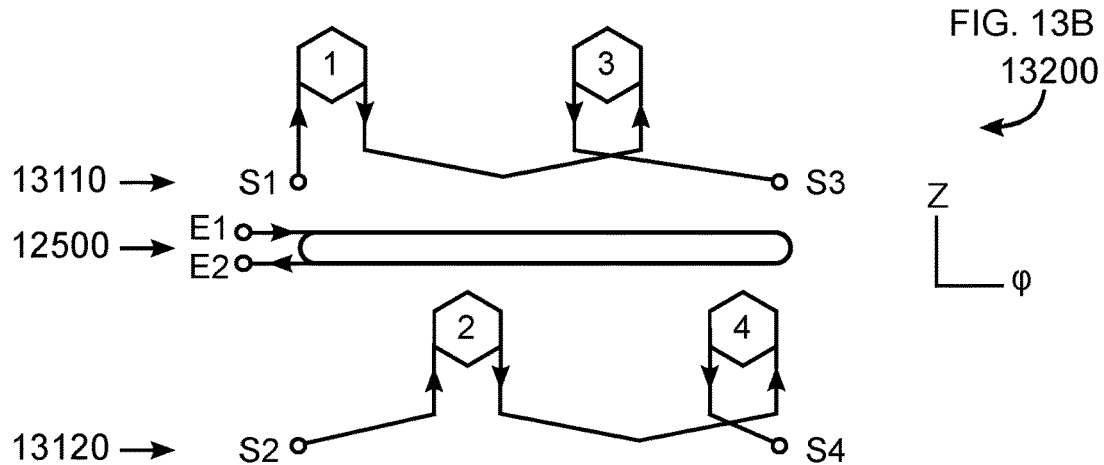

FIG. 2A shows the presence of a radial stator-rotor gap 1260. In the embodiments of FIGS. 1A, 1B, 2A, the stator-rotor gap distance is, for example, constant for all points at the radially inner surface of the one or more flanges 1110F1, 1110F2, 1110F3, 1110F4. The stator-rotor gap distance 1260 is, for example, smaller than the minimal pole-to-pole distance, or inter-pole gap 1115 (FIG. 3B), for example measured between the points where the flanges of two adjacent poles are closest. The inter-pole gap 1115 is, for example, greater than the stator-rotor gap 1260. In some embodiments, the stator 1100 comprises one or more stator inner fences 1160. A stator inner fence 1160 comprises, for example, a foil, for example an annular foil, positioned along the radially outer surface of the one or more flanges. The stator inner fence 1160 comprises, for example, one or more of the materials listed to form the groove layer 1141. The stator inner fence 1160 forms, for example, a membrane or a filling preventing line-of-sight from the rotor 1200 towards the winding assemblies 1110W1, 1110W2, 1110W3, 1110W4. The one or more stator inner fences 1160 provide a method to prevent ingress of dust or foreign objects into the annular volume comprising the windings. The winding assemblies 1110W1, 1110W2, 1110W3, 1110W4 comprise, for example, one or more sensory windings 13100, 13200 (FIG. 13A) and, depending on the resolver embodiment 13100 of FIG. 13A or 13200 of FIG. 13B, an excitatory winding 13101 or a peripheral excitatory winding 12500. The windings connect, for example, to a resolver-to-digital converter (RDC) 2000. The resolver-to-digital converter (RDC) 2000 provides, for example, a method for acquiring one or more signals from one or more electrical windings 1110W1, 1110W2, 1110W3, 1110W4, 1110WS (FIG. 2B), or winding lines 13110, 13120 (FIGS. 13A, 13B). In FIG. 2A the RDC 2000 is shown separate from the resolver 1000. In some embodiments, the RDC 2000 is, for example, embedded against or within the resolver 1000, for example against or within the stator 1100.

The enclosure 1300 comprises, for example, an enclosure case 1301 and an enclosure lid 1350. FIGS. 1A, 1B, and 2A present embodiments of enclosures 1300 that are, for example, cylindrical. Other possible embodiments of enclosures are, for example, parallelepipedic or any other shape and comprise, for example, anchoring points 1340, for example formed as one or more peripheral grooves, for fastening the enclosure 1300 to a support. The enclosure material comprises, for example, a non-magnetic material. The enclosure 1300, for example the enclosure case 1301, comprises one or more enclosure slots or pass-throughs 1321, for example aligned with one or more of the stator ring pass-throughs 1121, 1122, 1123, 1124.

Each flange 1110F of the stator embodiment presented in FIGS. 1A, 1B, 1C, 2A comprises a concave portion of a surface of revolution. For example, the rotor-facing flange conforms at an offset with the circumferential surface 1210 (shown in FIG. 1A) of the rotor 1200, leaving an air gap 1260 between the stator 1100 and the rotor 1200. For example, for an embodiment of the resolver 1000 comprising a cylindrical rotor of constant radius along the axis of rotation 1001, the rotor-facing flanges 1110F have a concave surface that, viewed along the direction of the rotor's axis of rotation Z, have a radius of curvature equal to that of the rotor 1200 plus the air gap 1260 between rotor 1200 and stator 1100. For example, for rotor embodiments having a radius in the range from 1 mm to 500 mm, the air gap 1260 is in the range of 0.01% to 5% of the rotor's radius, for example in a range from 20 μm to 5 mm.

FIG. 2B presents a planar mapping of a stator's pole 1110P, for example a pole 1110P1, 1110P2, 1110P3, or 1110P4, visualized by the contour of one or more of their flanges 1110F. The flange 1110F is presented against the rotor layer 1251 or rotor sector 1201. The poles 1110P1, 1110P2, 1110P3, 1110P4 comprise one or more electrical windings 1110W (from cross-section 2B-2B of FIG. 2A). For example, one or more poles comprises one or more signal (or sensory) windings 1110WS and one or more excitatory (or emitter) windings 1110WE wound around one or more teeth 1110T connecting to a flange 1110F. A sensory winding 1110WS is, for example, part of a so-called sine winding line 13110 or a so-called cosine winding line 13120 (FIGS. 13A, 13B). For example, each pole comprises a sensory winding and an excitatory winding. For example, the sensory winding on a pole is coaxial with the excitatory winding. For example, the sensory winding and the excitatory winding overlap coaxially, as shown in the embodiment of FIG. 2B with the sensory winding 1110WS overlapping excitatory winding 1110WE (another embodiment has, for example, a reverse overlapping). For example, the sensory winding and the excitatory winding are coaxial and adjacent to each other, for example a first winding is, along the windings' axes, closer to the rotor's axis than a second winding. For example, one or more flanges 1110F mask the one or more windings 1110WS, 1110WE from the rotor's 1200 radial line-of-sight.

FIG. 2C presents a radial cross-section from the stator ring 1100 to the rotor 1200 of FIG. 2A. The embodiment of the rotor 1200 comprises, for example, the rotor core 1250 of FIG. 2A that comprises a rotor layer 1251 that extends over a rotor sector 1201. FIG. 2C shows a cross section of the flange 1110F of FIG. 2B (shown as 1110F4 in FIG. 2A) separated from the rotor 1200 by the stator-rotor gap 1260. The flange 1110F masks the rotor's 1200 radial line-of-sight 2300 from the one or more winding assembly 1110W, for example comprising the one or more windings 1110WS, 1110WE, for example wound around the one or more teeth 1110T. The radial line-of-sight is, in the Z-direction, orthogonal to the surface of the rotor 1200. For example, within the span of the flange 1110F projected along the axis of revolution Z, the flange 1110F masks the one or more electrical windings 1110WS, 1110WE from the radial line-of-sight of the axis of revolution Z.

FIGS. 3A1, 3A2, 3A3 present different embodiments of poles 1110P for a class of flanges 1110F comprising a contour 3110F. The contour 3110F is formed, for example, by translating the coordinates of a sine function and its argument coordinates (for example points on the abscissa) along the direction of the ordinates axis, for example the $Z_\theta$-axis, so as to preserve the sine function's area distribution. The contour 3110F is formed, for example, substantially of a first contour portion 3110FP1 (viewed along the $Z_\theta$-axis, a top contour or line) $z_T=f(\alpha)+r\sin(\alpha)$, and substantially a second contour portion 3110FP2 (viewed along the Z-axis, a bottom contour or line) $z_B: =f(\alpha)-(1-r)\sin(\alpha)$, wherein: $f(\alpha)$ is a function representative of a supporting line 3200 (FIG. 3B). The function $f(\alpha)$ comprises, for example, one or more of: a linear function, a straight line, a non-linear function, a trigonometric function, a sigmoid function, and a spline. The parameter r is a ratio for distributing the sinewave with respect to the supporting line 3200 (FIG. 3A1) and is, for example, one or more of: a constant value, for example 0.5, and a function. The parameter $\alpha$ is an argument spanning a range of values substantially from 0 radians to $\pi$ radians, for example within a tolerance $D_\alpha$. For example, the parameter $\alpha$ is greater than or equal to a low bound within the range $[0, D_\alpha]$ radians and lower than or equal to a high bound in the range $[\pi-D_\alpha, \pi]$ radians with, for example, $D_\alpha=\pi/10$ radians. The argument $\alpha$ enables the flange's area distribution to span that of a first half-period of a sinewave.

TABLE 1

| α (°) | Bottom line | Top line |
|---|---|---|
| 0 | 0.000 | 0.000 |
| 10 | 0.004 | 0.178 |
| 20 | 0.011 | 0.353 |
| 30 | 0.023 | 0.523 |
| 40 | 0.042 | 0.685 |
| 50 | 0.072 | 0.838 |
| 60 | 0.112 | 0.978 |
| 70 | 0.167 | 1.106 |
| 80 | 0.235 | 1.220 |
| 90 | 0.318 | 1.318 |
| 100 | 0.417 | 1.401 |
| 110 | 0.530 | 1.470 |
| 120 | 0.658 | 1.524 |
| 130 | 0.799 | 1.565 |
| 140 | 0.951 | 1.594 |
| 150 | 1.114 | 1.614 |
| 160 | 1.284 | 1.626 |
| 170 | 1.459 | 1.632 |
| 180 | 1.636 | 1.636 |

In the embodiments of FIGS. 3A1, 3A2, 3A3, 3B: $\alpha=[0, \pi]$ radians and $f(\alpha)=a\alpha+b$. For example, one or more of the pole's flanges is delineated by at least the lines defined by: from $\alpha=0$ to $\alpha=\pi/2$ radians: $z_\theta=0$ and $z_\theta=\sin(\alpha)$, and from $\alpha=\pi/2$ to $\alpha=\pi$ radians: $z_\theta=1-\sin(\alpha)$ and $z_\theta=1$. Table 1 summarizes coordinates for embodiments of one or more of the flanges 1110F presented in FIGS. 1A, 1B, 1C, 2A, 2B, 3A1, 3A2, 3A3, 3B wherein $\alpha=[0, 180°]$, $a=1/110$ per degree, $b=0$, and $r=0.5$. A physical embodiment of a flange comprises, for example, uniformly scaled values for the first and second contour portions (bottom and top line, respectively) that are presented in Table 1.

FIGS. 3A1, 3A2 each present a pole 1110P comprising a tooth 1110TA1 and 1110TA2 of different cross-sectional length 1110TLA1 and 1110TLA2, respectively. The cross-section of the tooth 1110TA1 is, for example, a rounded rectangle, the long side of which is, for example, at an angle with respect to the supporting line 3200, for example with each extremity of the rectangle 1110TE1 and 1110TE2 at equal distance from the first contour portion 3110FP1 and the second contour portion 3110FP2. The external contour of the winding 1110W that is wound around the tooth 1110TA1 is, for example, at equal distance from the first contour portion 3110FP1 and the second contour portion 3110FP2. The external contour of the winding 1110W is, for example, comprised within the aggregate contour formed of the first contour portion 3110FP1 and the second contour portion 3110FP2. The length 1110TLA1 of the long side of the tooth's cross-section is, for example, comprised in a range from 0.1 times to 0.95 times, for example 0.2 times to 0.5 times, the length of the flange's supporting line 3200 from the contour's lowest $\alpha$ abscissa (corresponding the the pole's low bound 1110E-0, for example where $\alpha$ is within the range $[0, D_\alpha]$ radians, where $D_\alpha=\pi/10$ radians, for example $\alpha=0$) to the contour's greatest a abscissa (corresponding the the pole's high bound 1110E-180, for example where $\alpha$ is within the range $[\pi-D_\alpha, \pi]$ radians, for example $\alpha=\pi$). In some embodiments of a pole, the flange 3110F is mounted on one or more teeth 1110TA1, 1110TA2, example having different cross-sectional lengths 1110TLA1, 1110TLA2, respectively. The winding 1110W wound around tooth 1110TA2 comprises, for example, a greater length of wire than that wound around tooth 1110TA1 due to a comparatively larger tooth cross-sectional length.

FIG. 3A2 further presents an embodiment for a pole 1110P that comprises a hollow tooth 1110TA2. For example, one or more of the first pole 1110P1, the second pole 1110P2, and the third pole 1110P3 comprise a hollow tooth 1110TA2. The hollow tooth 1110TA2 comprises, for example, a magnetic core material, for example in the form of a granulate or a powder, for example in a form used for sintering processes. A method to form the hollow tooth 1110TA2 comprises, for example, an additive manufacturing process, for example sintering, selective laser sintering (SLS), selective laser melting (SLM), direct metal laser sintering (DMLS), and laser power bed fusion (LPBF). In some embodiments, the hollow tooth 1110TA2 encloses sintering material.

Figure 19:
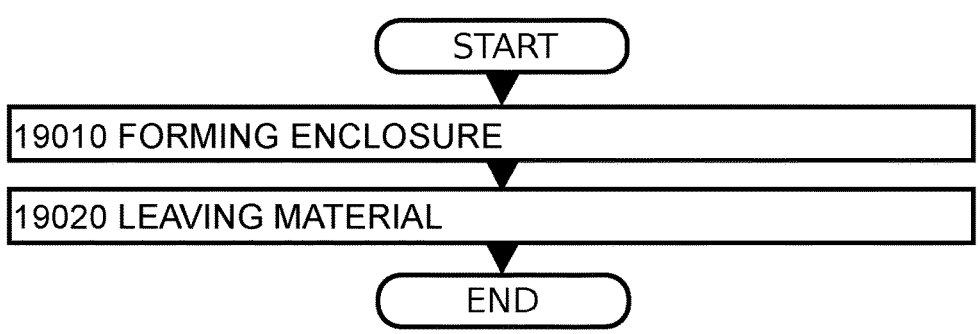
FIG. 19 presents a method 19000 to form a hollow tooth.

FIG. 19 presents a method 19000 to form a hollow tooth 1110TA2 that encloses sintering material. The method 19000 comprises, for example, the steps of i) forming 19010 an enclosure, for example shaped according to the tooth's contours, around the sintering process material using one or more of the additive manufacturing processes; and ii) leaving material of the additive manufacturing process 19020, for example a sintering process material, for example in one or more of a sintered, partly sintered, and unsintered state, within the hollow tooth 1110TA2. For example, a stator 1101 comprises one or more hollow teeth 1110TA2. For example, one or more hollow teeth 1110TA2 comprise a flange 1110F at their radially inward extremity. For example, the flange 1110F encloses the hollow tooth's 1110TA2 inward extremity.

FIG. 3A3 presents an embodiment of a pole 1110P that comprises two or more flange portions 3110FA, 3110FB. The combined area of the flange portions 3110FA, 3110FB is equal to that of the flanges 3110F of FIGS. 3A1, 3A2. Each flange portions 3110FA, 3110FB comprises one or more teeth 3110TA, 3110TB, respectively, each tooth comprising one or more windings 1110WA, 1110WB, respectively. The flange portions 3110FA, 3110FB correspond in shape to a flange 3110F, 1110F divided by a dividing line 3110DL, for example a straight line, and separated, for example by an intra-flange gap with distance 1117, along a direction that is parallel to the rotor's axis of revolution 1001. In some embodiments of a pole, the flange portions 3110FA, 3110FB are mounted on one or more teeth 1110TA, 1110TB, for example having different cross-sectional lengths 1110TL.

Figure 3B:
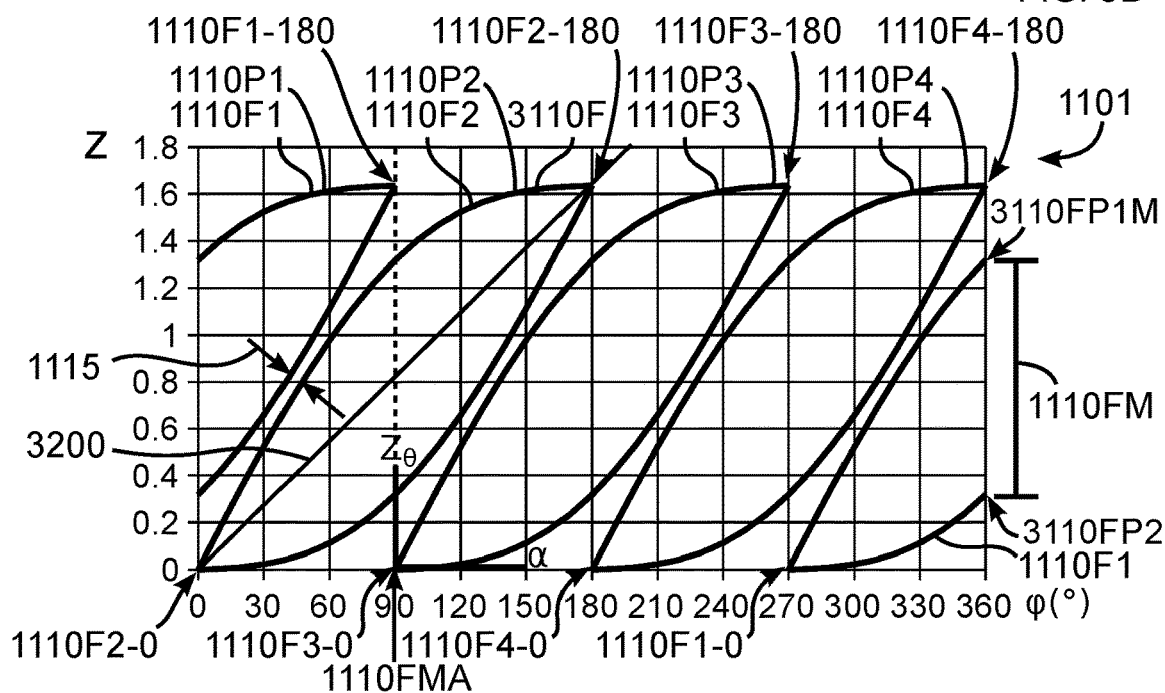
FIG. 3B presents a layout for a set of flanges of a stator's poles.

FIG. 3B presents a mapping of the stator ring 1101 and the layout of the flanges 3110F of each pole 1110P of a stator 1100 over the stator's inner circumference in an azimuthal range from $\varphi=0°$ to $\varphi=360°$. For example, the stator 1100 of the embodiment of FIG. 3B comprises four poles 1110P1, 1110P2, 1110P3, 1110P4 (shown in FIGS. 1A, 1B, 1C, 2A) with the respective flanges 1110F1, 1110F2, 1110F3, 1110F4. The supporting line 3200 is indicated for flange 1110F2. The inter-pole gap distance 1115 is indicated between flanges 1110F1 and 1110F2 and is, for example, greater than that of the stator-rotor gap 1260. The poles 1110P1, 1110P2, 1110P3, 1110P4, each visualized by their respective flange 1110F1, 1110F2, 1110F3, 1110F4, are arranged circumferentially around the axis of revolution 1001 in an azimuthal sequence ranging azimuthally from $\varphi=0°$ to $\varphi=360°$. The low bound 1110F1-0, 1110F2-0, 1110F3-0, 1110F4-0, and the high bound 1110F1-180, 1110F2-180, 1110F3-180, 1110F4-180, of each respective pole 1110P1, 1110P2, 1110P3, 1110P4, or flange 1110F1, 1110F2, 1110F3, 1110F4, is also represented.

In FIG. 3B, the pole's frame of reference ($Z_\theta$; $\alpha$) (shown for clarity at a translated position in FIGS. 3A1, 3A2, 3A3) is set at an angle of $\theta=0$ with respect to a radial projection of the axis of revolution Z onto the surface of revolution comprising the flanges. Within the stator's frame of reference (Z; $\varphi$), $\varphi$ representing the azimuthal position around the Z axis, the circumferential arrangement comprises, for example, a first pole 1110P1, a second pole 1110P2, and a third pole 1110P3, wherein the azimuthal position of the low bound 1110F3-0 of the third flange 1110F3 has the same azimuthal position as the high bound 1110F1-180 of the first flange 1110F1. The azimuthal location where the second pole 1110P2 has its greatest extent 1110FM in a direction parallel to the axis of revolution between a first point of greatest extent 3110FP1M on the first contour portion and a second point of greatest extent 3110FP2M on the second contour portion is, for example, one or more of the same azimuthal locations as where the first pole has its high bound 1110F1-180 and where the third pole has its low bound 1110F3-0. An alternative embodiment is, for example, a reverse arrangement where, in a direction of increasing $\varphi$, a flange's high bound precedes the low bound (for example as a mirror image of FIG. 3B).

Alternative embodiments comprise, for example, an arrangement where the poles 1110P, for example the first pole 1110P1, the second pole 1110P2, and the third pole 1110P3, are rotated by a same angle $\theta$, for example $\theta$ is within the range [$-\pi/4$, $\pi/4$] radians with respect to a radial projection of the axis of revolution Z onto the surface of revolution. Within the poles' frame of reference ($Z_\theta$; $\alpha$), $\alpha$ representing the argument to the function $z_\theta(\alpha)=\max(0, \sin(\alpha)\pm D_z)$, for example with $D_z=0$ in FIG. 3B, describing the area distribution of a pole's flange, the high $\alpha$ bound of the first pole's flange and the low $\alpha$ bound of the third pole's flange are aligned with the $\alpha=\pi/2$ abscissa 1110FMA of the second pole's flange's contours. For example, the abscissa $\alpha=\pi/2$ is that where, in a direction parallel to the pole's $Z_\theta$ axis, the second pole flange contours or contour portions 3110FP1, 3110FP2 are the furthest apart from each other. The alignment of the high $\alpha$ bound of the first pole's flange and the low $\alpha$ bound of the third pole's flange form a so-called gapless arrangement: there is no azimuthal location at the rotor surface wherein the rotor does not face a flange's surface.

Figure 3C:
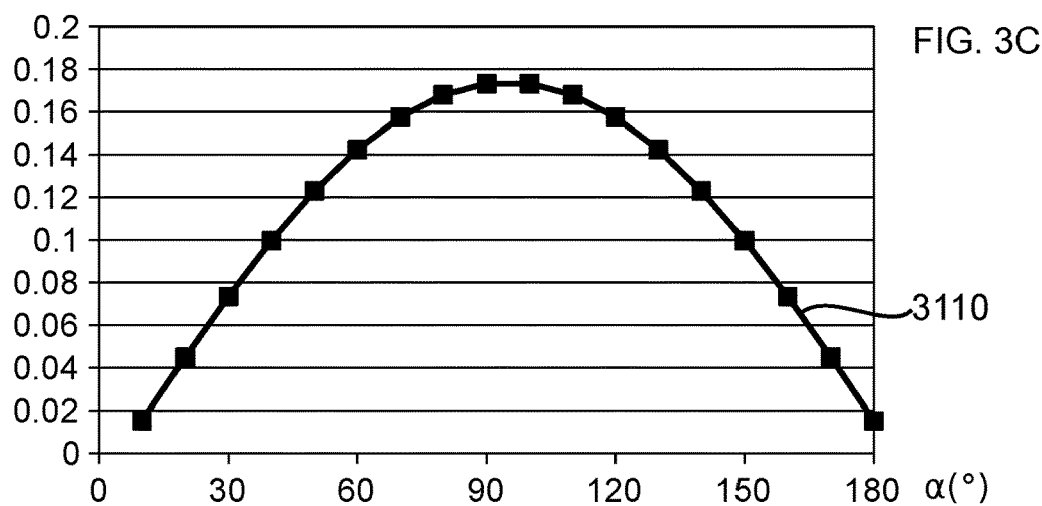
FIG. 3C is a plot of the area distribution of one of the flanges presented in FIG. 3B.

FIG. 3C presents a curve 3110 describing the area distribution, for example computed in steps of 10°, of the flange 1110F, 3110F or the aggregate area of one or more flange portions 3110FA, 3110FB, of a pole 1110P. FIG. 3C, for the purpose of illustration, presents data resulting from a numerical integration using a trapezoidal rule but other numerical integration methods are used, for example, for the integration. The abscissa offset of 10° visible in FIG. 3C is due to the numerical computation. The amplitude progression between the first contour portion 3110FP1 and the second contour portion 3110FP2 (FIG. 3A1) from the flange low bound 1110F1-0 ($\alpha=0°$) to the flange high bound 1110F1-180 ($\alpha=180°$) follows that of a sinewave. Consequently, the area progression or area distribution is equal to the area distribution of a sinewave-based function.

Figure 4:
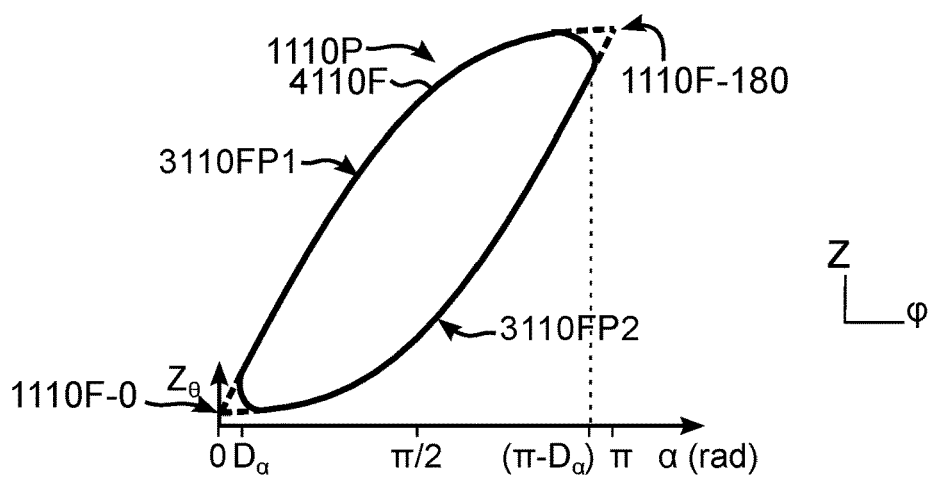
FIG. 4 presents an alternative embodiment for a flange.

FIG. 4 presents an alternative embodiment for a flange 4110F. The flange's contour is, for example, truncated at one or more of the low bound ($\alpha=0°$) and the high bound ($\alpha=180°$), for example by a tolerance value within the range [0, $D_\alpha$] radians, for example where $D_\alpha=\pi/10$ radians. The tolerance value is, for example, used for one or more of manufacturing tolerance and electromagnetic tolerance purposes, for example as a function of the average angle, for example within a range [0, $D_\alpha$] radians, at which the first contour portion 3110FP1 (FIG. 3A1) meets the second contour portion 3110FP2. For example, one or more of the flange's low bound 1110E-0 and the flange's high bound 1110E-180 is rounded, for example within a range [0, $D_\alpha$] radians. The sinewave-based function that describes the amplitude progression between the first contour portion 3110FP1 and the second contour portion 3110FP2 from the flange low bound 1110E-0 ($\alpha=0°$) to the flange high bound 1110E-180 ($\alpha=180°$) as a function of $\alpha$ is, for example, also subject to an amplitude tolerance of $D_z$. For example, the amplitude along the Z-axis (that is parallel to the stator's axis of revolution) between the first contour portion 3110FP1 and the second contour portion 3110FP2 is described as $z(\alpha)=\max(0, \sin(\alpha)\pm D_z)$, where $D_z=0.05$ or, for a smaller tolerance, $D_z=0.02$. For a given pole 1110P, the area distribution for a flange's surface in an azimuthal direction is, from a low bound extremity to a high bound extremity, equal to the area distribution of a sinewave-based function $z(\alpha)=\max(0, \sin(\alpha)\pm D_z)$ on the surface of the solid of revolution, wherein the argument value a is azimuthally-oriented and spans a range of values that are greater than or equal to a low bound within the range [0, $D_\alpha$] radians and lower than or equal to a high bound in the range [$\pi-D_\alpha$, $\pi$] radians, $D_\alpha=\pi/10$ radians, and $D_z=0.05$ or, fora smaller tolerance, $D_z=0.02$.

Figure 5:
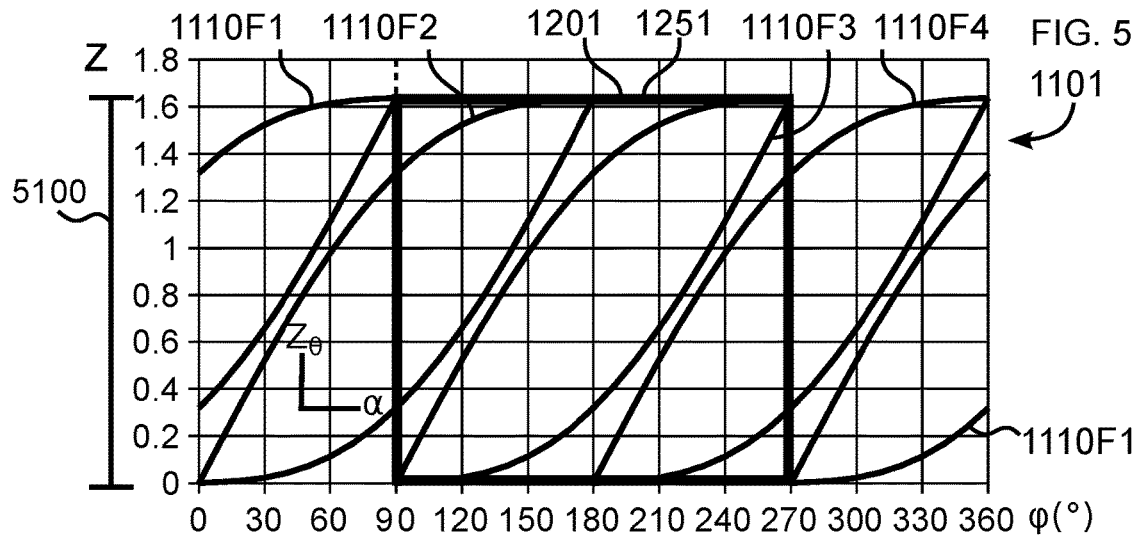
FIG. 5 is a replica of the set of flanges or poles presented in FIG. 3B.

FIG. 5 is a replica of the set of flanges or poles presented in FIG. 3B. FIG. 5 further represents an embodiment of the radial projection of, for example, the first rotor sector 1201 or the first rotor layer 1251, thereafter called first rotor sector 1201. The radial projection of the first rotor sector 1201 is, for example, rectangular. The first rotor sector extends azimuthally, for example, as much as one flange 1110F, for example 180°. The first rotor sector 1201 extends in the Z-direction to at least cover the Z-extent or flange height 5100 of all flanges 1110F comprised on the stator 1100. For example, if flanges 1110F are offset from each other in the Z-direction, the material of the first rotor sector travels over the rotor's azimuthal course, for example one 360° rotation of the rotor, past all flanges 1110F. The first rotor sector has an azimuthal extent that is equal, within a tolerance of 2%, for example 1%, to that of the azimuthal extent of one flange 1110F.

Figure 6:
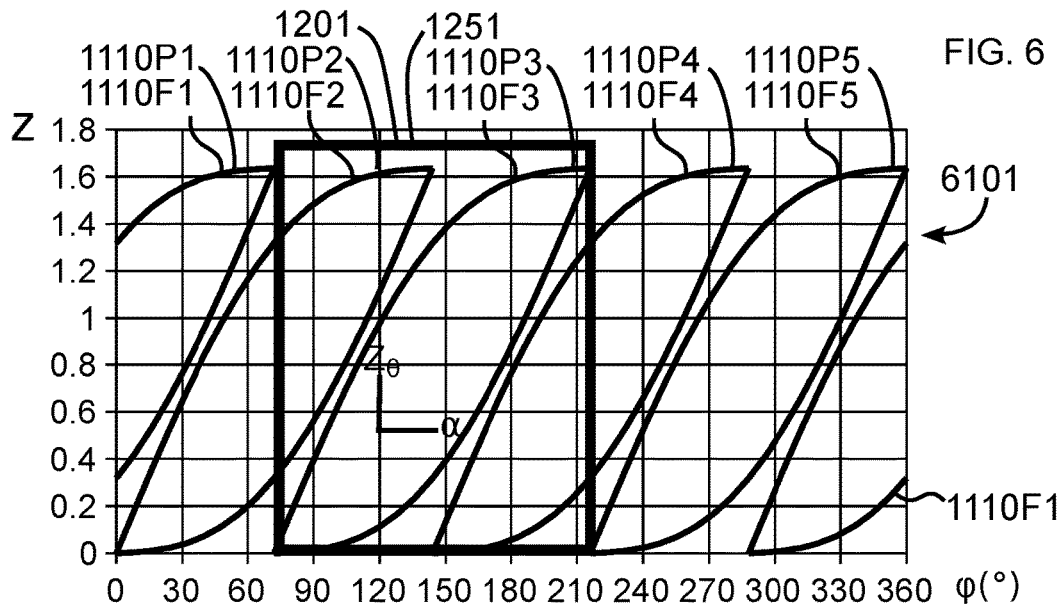

FIG. 6 presents an alternative embodiment 6101 for the stator flange layout embodiment 1101 presented in FIGS. 3B, 5. The stator presented in FIG. 6 comprises, for example, 5 poles 1110P1 to 1110P5, each visualized by their respective flange 1110F1 to 1110F5. In FIG. 6, the 5 poles are arranged at regular azimuthal intervals of $2\pi/5$ radians around the stator's axis of revolution 1001 and each extends over $4\pi/5$ radians. Further alternative embodiments, for example comprising N poles are, for example, arranged at regular azimuthal intervals of $2\pi/N$ radians around the stator's axis of revolution 1001 and each extends over $4\pi/N$ radians. Yet further alternative embodiments comprise, for example, poles over an azimuthal range φ that is less than $2\pi$ radians, for example to provide a device used to measure angular deflections that extend over less than $2\pi$ radians. Similarly to FIG. 5, FIG. 6 further represents an embodiment of the radial projection of, for example, the first rotor sector 1201 or the first rotor layer 1251. The radial projection of the first rotor sector or layer is, for example, rectangular. The first rotor sector or layer extends azimuthally, for example, as much as one flange 1110F, for example $2\pi/5$ radians or $2\pi/N$ radians. The alternative embodiment 6101 comprises, for example, sensory winding lines 13110, 13120 (FIG. 13A) on only four or four plus a multiple of two poles, for example 4 out of 5 poles. For example, the embodiments 6101 with sensory winding lines 13110, 13120 on successive poles 1110P1, 1110P2, 1110P3, 1110P4 enables angular position measurements over at least 4×72°=288°.

Figure 7:
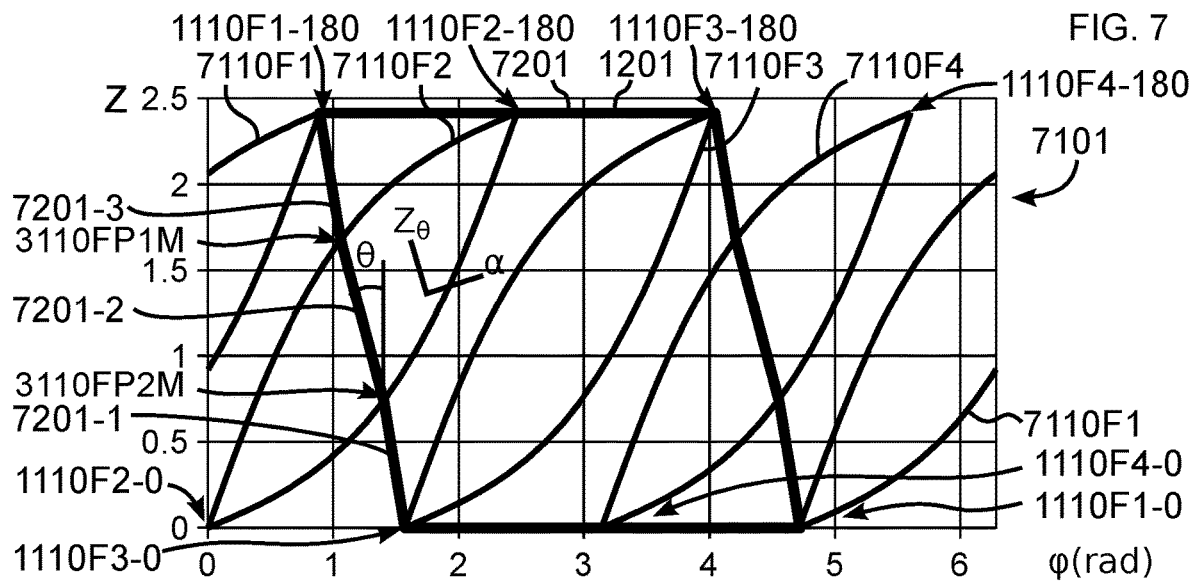

FIG. 7 presents an alternative embodiment 7101 for the stator flange layout presented in FIG. 3B and FIG. 5. The embodiment 7101 comprises four flanges 7110F1, 7110F2, 7110F3, 7110F4 that have been rotated by an angle θ (as shown by the rotated coordinate system $(\alpha; Z_\theta)$) within the range $[-\pi/3, \pi/3]$ radians, for example within the range $[-\pi/4, \pi/4]$ radians, for example within ranges [−25°, −10°] or [25°, 10°], for example 20°, with respect to a radial projection of the axis of revolution Z onto the surface of revolution. FIG. 7 represents an embodiment of the radial projection 7201 of, for example, the first rotor sector 1201 or the first rotor layer 1251. The first rotor sector or layer projection 7201 extends azimuthally, for example, described clockwise, from the high bound 1110F1-180 of a first flange 1110F1, 7110F1 to the high bound 1110F3-180 of a third flange 1110F3, 7110F3, to the low bound of the flange located two flanges further which, in the case of a 4-flange stator, is the low bound 1110F1-0 of the first flange 1110F1, 7110F1, to the low bound 1110F3-0 of the third flange 1110F3, 7110F3, and back to the high bound 1110F1-180 of the first flange 1110F1, 7110F1. The description for the first rotor sector or layer projection 7201 can be reversed, for example, for an embodiment where flanges are oriented in a left-right direction that is opposite of that show in FIG. 7. In some embodiments of the first rotor sector 1201 or the first rotor layer 1251, the projection 7201 is a parallelogram. In some embodiments, the projection 7201 comprises, for example, three or more segments 7201-1, 7201-2, 7201-3 in the sides joining a low bound 1110F1-0, 1110F3-0 to a high bound 1110F3-180, 1110F1-180. For example, a first segment 7201-1 joins the low bound 1110F1-0, 1110F3-0 to the second point of greatest extent 3110FP2M (in an unrotated frame of reference where θ=0). For example, a second segment 7201-2 joins the second point of greatest extent 3110FP2M to the first point of greatest extent 3110FP1M (in an unrotated frame of reference where θ=0). For example, a third segment 7201-3 joins the first point of greatest extent 3110FP1M to the high bound 1110F1-180, 1110F3-180. In some embodiments, the three or more segments 7201-1, 7201-2, 7201-3 are replaced by, for example, an S-shaped curve or a spline, for example passing through the points of greatest extent 3110FP1M, 3110FP2M.

FIG. 8A presents an alternative embodiment 8101 for the stator flange layout presented in FIG. 3B and FIG. 5. The embodiment 8101 comprises four flanges 8110F1, 8110F2, 8110F3, 8110F4 that, compared to flanges 1110F1, 1110F2, 1110F3, 1110F4 of FIG. 5, have been sheared by an angle θ (as shown by the sheared coordinate system $(\alpha; Z_\theta)$) within the range $[-\pi/3, \pi/3]$ radians, for example within the range $[-\pi/4, \pi/4]$ radians, for example within ranges [−25°, −10°] or [25°, 10°], for example 20°, with respect to a radial projection of the axis of revolution Z onto the surface of revolution. FIG. 8A represents an embodiment of the radial projection 8201 of, for example, the first rotor sector 1201 or the first rotor layer 1251. The first rotor sector or layer projection 8201 is, for example, a parallelogram that extends azimuthally, for example, described clockwise, from the high bound of a first flange 8110F1 to the high bound of a third flange 8110F3, to the low bound of the flange located two flanges further which, in the case of a 4-flange stator, is the low bound of the first flange 8110F1, to the low band of the third flange 8110F3, and back to the high bound of the first flange 8110F1. The description for the first rotor sector or layer projection 8201 can be reversed, for example, for an embodiment where flanges are oriented in a left-right direction that is opposite of that shown in FIG. 8A. FIG. 8B is a perspective view of the rotor 1200, the rotor layer 1251 of which, for example shaped as a parallelogram wrapped around a cylindrical rotor, is radially projected and represented as radial projection 8201 in FIG. 8A. An alternative embodiment for the rotor 1200 comprises, for example, a first rotor sector 1201 and a second rotor sector 1202 that contact each other along a first line and a second line that are at a same angle with respect to a radial projection of the axis of revolution 1001.

FIG. 9 presents a plot for an alternative embodiment for a flange 1110F, for example a first sigmoid flange 9000, the sinewave-based area distribution of which is supported by a supporting line 3200 defined as an S-shaped or sigmoid function, for example one or more of: a logistic function of type $z=1/(1+e^{-\alpha})$; a hyperbolic tangent; an arctangent; a Gudermannian function; a function that comprises an exponential term or the integral of an exponential term, for example a Gauss error function; a Smoothstep function; and a function of type $z=a/\sqrt{(1+a^2)}$. The supporting line equation is, for example, $z_{SL}=\pi/5\times\alpha-1/(1+e^{-c(\alpha-\pi/2)})$ with, for example, c=2.718 . . . (the Euler constant e), and for the first contour portion 3110FP1, $z=z_{SL}+\sin(\alpha)/2$ and for the second contour portion 3110FP2, $z=z_{SL}-\sin(\alpha)/2$. Further alternative embodiments comprise, for example, one or more scaling factors, for example one or more different values for c or various coefficients within the supporting line equation or applied to the sine function.

TABLE 2

| α (°) | Bottom line | Top line |
|---|---|---|
| 0.0 | 0.000 | 0.000 |
| 10.0 | 0.000 | 1.216 |
| 20.0 | 0.000 | 2.394 |
| 30.0 | 0.001 | 3.501 |
| 40.0 | 0.002 | 4.502 |

TABLE 2-continued

| α (°) | Bottom line | Top line |
|---|---|---|
| 50.0 | 0.009 | 5.372 |
| 60.0 | 0.038 | 6.100 |
| 70.0 | 0.153 | 6.731 |
| 80.0 | 0.618 | 7.512 |
| 90.0 | 2.500 | 9.500 |
| 100.0 | 4.488 | 11.382 |
| 110.0 | 5.269 | 11.847 |
| 120.0 | 5.900 | 11.962 |
| 130.0 | 6.628 | 11.991 |
| 140.0 | 7.498 | 11.998 |
| 150.0 | 8.499 | 11.999 |
| 160.0 | 9.606 | 12.000 |
| 170.0 | 10.784 | 12.000 |
| 180.0 | 12.000 | 12.000 |

FIG. 10 presents a plot for another alternative embodiment for a flange 1110F, for example an S-shaped flange 10000, the sinewave-based area distribution of which is supported by a supporting line 3200 (shown in bold) defined as an S-shaped function of type $z=a \times b^{(\alpha-\pi/2)}$ in radians, for example using degrees, $z=5/2 \times 1.15^{-(90-\alpha)}$ calculated from α=0° to 90°, reversed from α=90° to 180°, and using a construction as that used for FIG. 9, the contour's exemplar characteristic points or waypoints (for example for spline fitting) defining the first contour portion 3110FP1 ("Top line") and second contour portion 3110FP2 ("Bottom line") are presented in Table 2.

Figure 11A:
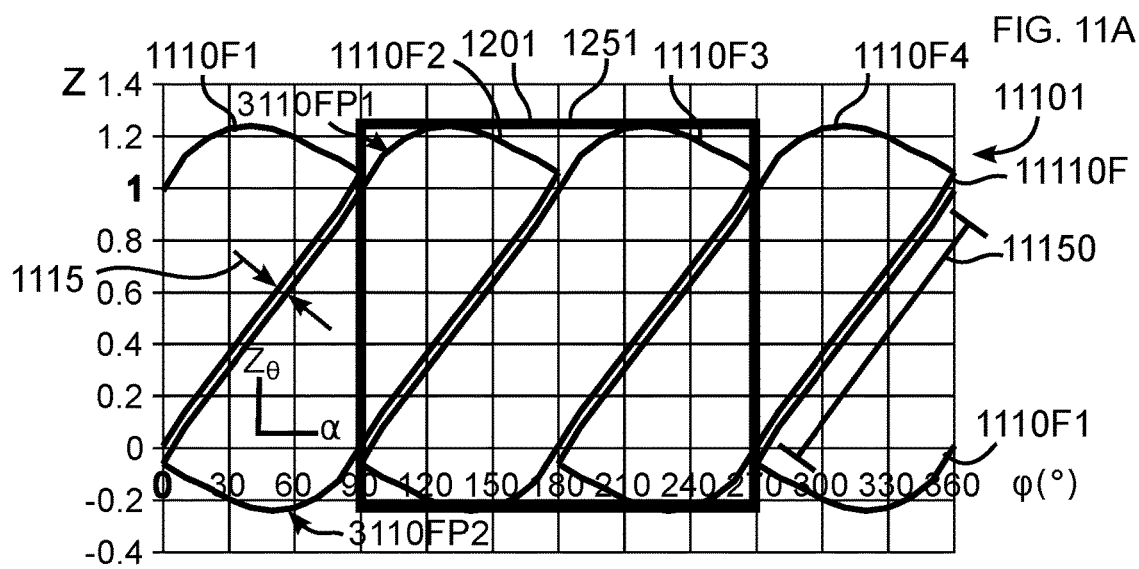
FIGS. 11A, 12A present alternative layout embodiments for a set of flanges.

FIG. 11A presents an alternative embodiment 11101 for the stator flange layout embodiment 1101 presented in FIG. 3B with alternative flange embodiments 11110F, each comprising straight line portions 11150 along the inter-pole gap 1115. The flange embodiment 11110F is, for example, defined by one or more supporting line equations, for example comprising one or more segments. For example, a first contour portion 3110FP1 of the flange 11110F comprising straight line portions 11150 is defined by (within a tolerance of 10° for each segment starting and ending points or waypoints), with a gap value g=0.03, an extremity or tip raise value t=2, and a middle expansion value m=0.3: for α=0°, z=1/90α−g×t; from α=10° to 80°, z=1/90α−g; for α=90°, z=1/90α−g×m; from α=100° to 160°, z=1+1/90α−1+g−(1−sin(α)); for α=170°, z=1+1/90α−1+g+t/100; and for α=180°, z=1+1/90α−1+g×m−(1−sin(α)). The second contour portion 3110FP2 is, for example: for α=0°, z=1/90α−g×t−sin(α); for α=10°, z=−sin(α)−(1/90α−g)−t/100); from α=10° to 80°, z=1/90α−g−sin(α); for α=90°, z=1/90α−1+g×m; from α=100° to 170°, z=1/90α−1+g; and for α=180°, 1/90α−1+g×m. The contours' exemplar characteristic points or waypoints (for example for spline fitting) defining the first contour portion 3110FP1 ("Top line") and second contour portion 3110FP2 ("Bottom line") are presented in Table 3. As in FIGS. 3B and 5, FIG. 11A represents an embodiment of the radial projection of, for example, the first rotor sector 1201 or the first rotor layer 1251.

TABLE 3

| α (°) | Bottom line | Top line |
|---|---|---|
| 0 | 0.866 | 1.047 |
| 10 | 0.940 | 1.222 |
| 20 | 0.985 | 1.396 |
| 30 | 1.000 | 1.571 |
| 40 | 1.000 | 1.745 |
| 50 | 1.000 | 1.920 |
| 60 | 1.000 | 2.094 |
| 70 | 1.000 | 2.269 |

TABLE 3-continued

| α (°) | Bottom line | Top line |
|---|---|---|
| 80 | 1.000 | 2.443 |
| 90 | 1.000 | 2.618 |
| 100 | 0.637 | −0.229 |
| 110 | 0.748 | −0.192 |
| 120 | 0.859 | −0.126 |
| 130 | 0.991 | 0.009 |
| 140 | 1.126 | 0.141 |
| 150 | 1.192 | 0.252 |
| 160 | 1.229 | 0.363 |
| 170 | 1.240 | 0.474 |
| 180 | 1.228 | 0.586 |

Figure 11B:
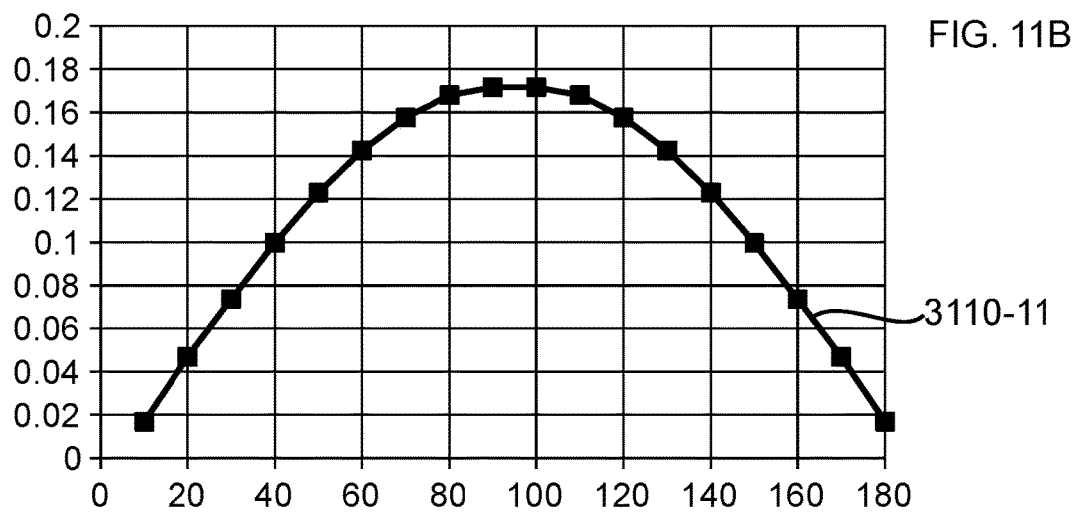
FIG. 11B is a plot of the area distribution of the flange presented in FIG. 11A.
Figure 17:
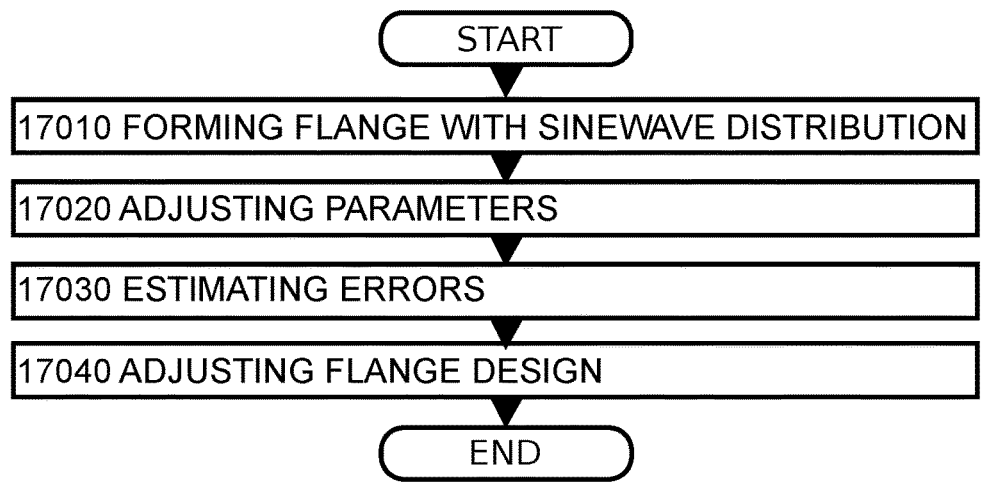
FIG. 17 presents a method for designing a stator's flange.

FIG. 11B presents a curve 3110-11 describing the area distribution, for example computed in steps of 10°, of the flange 11110F. Compared to the area distribution 3110 depicted in FIG. 3C, the area distribution deviates by a margin of less than 4% from about 10° to 20° and 170° to 180°, and by a margin of less than 1% from about 90° to 100°, from the sinewave-based area distribution of FIG. 3C. Note that angular values are offset by 10° due to a numerical integration in steps of 10°. Angular values are provided with a tolerance of 10°. FIGS. 11A and 11B illustrate a method 17000 (FIG. 17), for example provided as computer-readable instructions stored on a non-volatile storage device, for designing a flange 1110F, 11110F, comprising the steps of: i) forming 17010 a flange design characterized by a sinewave-based area distribution, for example from 0° to 180°; ii) adjusting 17020 design parameters, for example the inter-pole gap 1115; iii) estimating 17030 errors, for example over a plurality of angular positions, in the area distribution; and iv) adjusting 17040 the flange design to maintain errors, for example at a plurality of angular positions, within a tolerance margin, for example 10%, for example 5%, for example 1%, for example 0.5%, for example as a function of the location with the range of 0° to 180°.

Figure 12A:
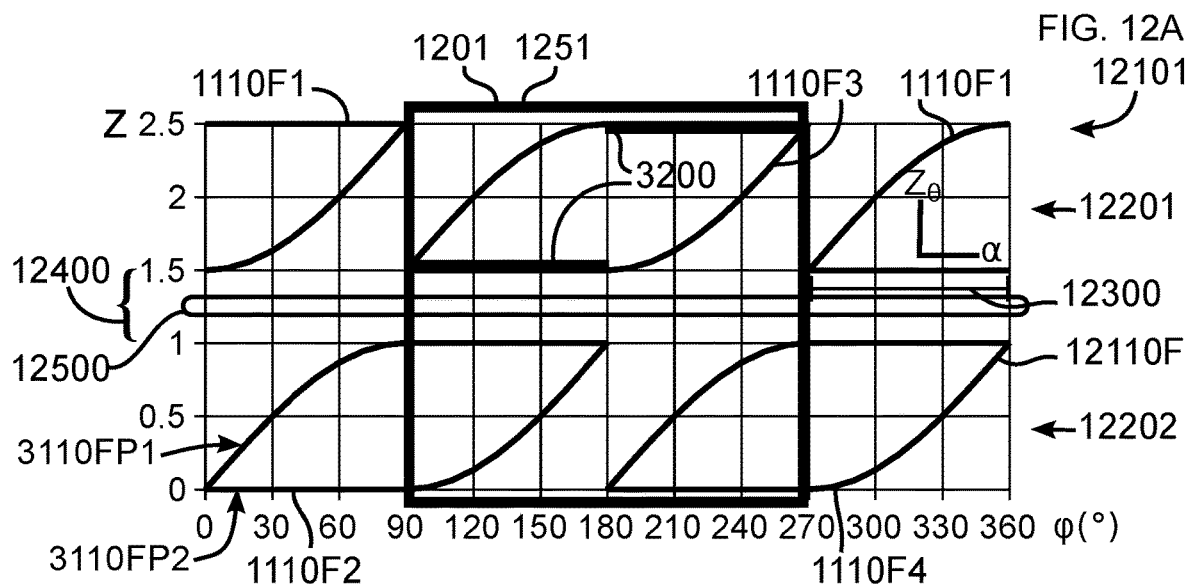

FIG. 12A presents an alternative stator ring embodiment 12101 for the stator flange layout embodiment 1101 presented in FIG. 3B with alternative flange embodiments 12110F, each comprising straight supporting line 3200 segments (shown in bold) in a contour portion 12300 that extends in the α direction, for example also in the φ direction. The straight segment 12300 in the contour extends, for example, from α=0° to 90° (bottom line 3110FP2) and α=90° to 180° (top line 3110FP1). The contours of the flange 12110F are, for example: for the bottom line 3110FP2, from α=0° to α=90°, z=0, and from α=90° to α=180°, z=−sin(α); for the top line 3110FP1, from α=0° to α=90°, z=sin(α), and from α=90° to α=180°, z=1. A further alternative embodiment has, for example, the first and second contours that are offset from each other in the Z-direction. In the embodiment 12101, four or more flanges 12110F (1110F1, 1110F2, 1110F3, 1110F4) are positioned at staggered heights in the Z-direction. For example, a Z-direction gap 12400 is formed between a first row 12201 and a second row 12202 of flanges 12110F. The Z-direction gap 12400 is used, for example, to position an excitatory winding line 12500, a radial projection of which is represented on the layout graph of FIG. 12A, for example at mid-height in the Z-direction gap 12400. As in FIGS. 3B and 5, FIG. 12A represents an embodiment of the radial projection of, for example, the first rotor sector 1201 or the first rotor layer 1251 that, for example, extends in the Z-direction to cover flanges of the first and the second rows 12201, 12202.

Figure 12B:
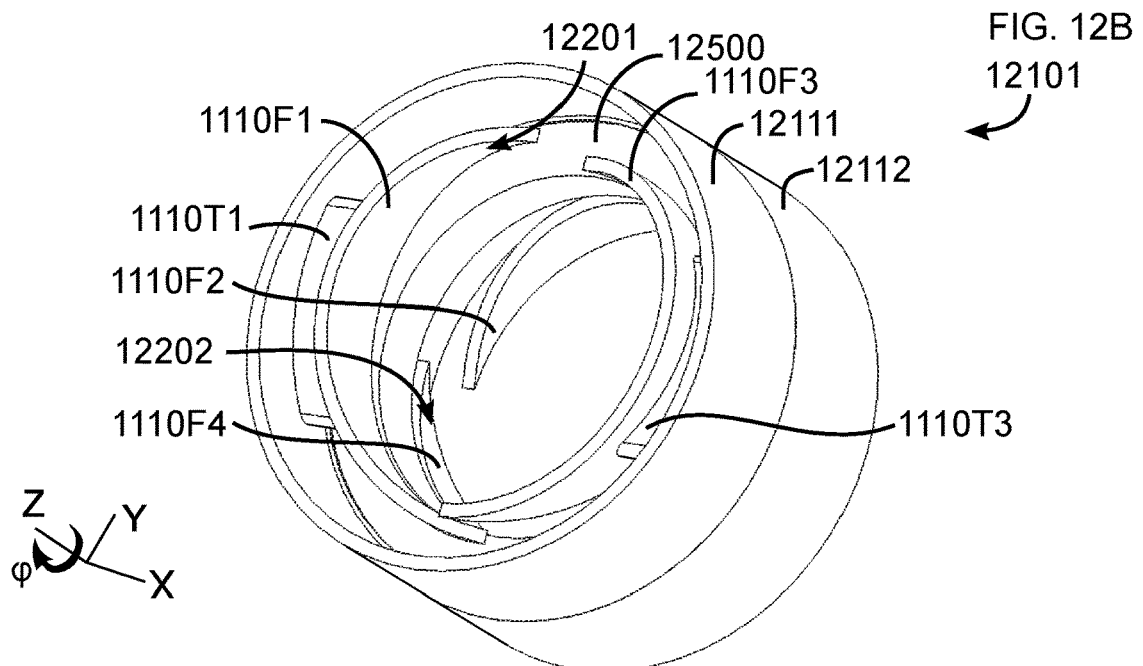
FIG. 12B is a perspective view of a stator embodiment for the flange layout of FIG. 12A.

FIG. 12B is a perspective view of the stator ring embodiment 12101 of FIG. 12A. FIG. 12B illustrates an opposing arrangement of even- and odd-numbered flanges on the respective first and second rows 12201, 12202. For example, the first row 12201 is embodied as a first stator ring 12111 and the second row 12201 is embodied in a second stator ring 12112. For example, the stator ring embodiment 12101 is formed as an assembly of the first ring 12111 and the second stator ring 12112. For example, the first stator ring 12111 and the second stator ring 12112 are identical components that are assembled together with an offset around the Z-axis, for example an offset of 90°. For visual clarity, FIG. 12B does not represent the winding assemblies 1110W1, 1110W2, 1110W3, 1110W4 (FIG. 2A) around the teeth 1110T (for example the visible teeth 1110T1 and 1110T3). The stator ring 12101 comprises, for example, the winding 12500, for example positioned against the inner periphery of stator ring 12101, for example enclosed between the first and the second stator rings 12111, 12112, for example where they contact each other.

FIG. 13A presents a first winding assembly 13100 for a stator 1101, 7101, 8101, 11101. The winding assembly 13100 comprises, for example, three winding lines 13101, 13110, 13120, for example each wound continuously. The first winding assembly 13100 comprises an excitatory winding line 13101 wound in alternating directions around successive poles, for example: clockwise around the first pole 1110P1, anti-clockwise around the second pole 1110P2, clockwise around the third pole 1110P3, and anti-clockwise around the fourth pole 1110P4. The first winding assembly 13100 comprises a first sensory winding line 13110, for example a sine winding, wound in alternating directions around a first set of odd-numbered poles, for example: clockwise around the first pole 1110P1, and anti-clockwise around the third pole 1110P3. The first winding assembly 13100 comprises a second sensory winding line 13120, for example a cosine winding, wound in alternating directions around a second set of even-numbered poles, for example: clockwise around the second pole 1110P2, and anti-clockwise around the fourth pole 1110P4. For example, a first set of the poles, for example odd-numbered poles, 1110P1, 1110P3 comprises a sine sensory winding line 13110 and a second remaining set of poles, for example even-numbered poles, 1110P2, 1110P4, comprises a cosine sensory winding line 13120.

FIG. 13B presents a second winding assembly 13200 for the alternative stator ring embodiment 12101. The second winding assembly 13200 comprises: a first sensory winding line 13110; a second sensory winding line 13120; and an excitatory winding 12500, for example wound around the Z axis, for example against the inner periphery of stator ring 12101.

Although the embodiments for the first and the second winding assemblies 13100, 13200 are presented for four-pole embodiments, embodiments comprising more than two pairs of poles or more than two phases are, for example, possible by adding one or more of: pairs of poles 1110P to the stator; sensory winding lines 13110, 13120; and excitatory windings 13101 (1110WE in FIG. 2B), 12500.

For example, one or more poles 1110P that comprise one or more excitatory windings 13101 and one or more sensory winding lines 13110, 13120 comprise more turns, for example around the pole's one or more teeth 1110T, for each of the sensory windings, for example the sine winding line 13110 or the cosine winding line 13120, than for the excitatory winding 13101 on a given pole. For example, one or more of a first pole 1110P1 and a third pole 1110P3 each comprise $N_E$ turns for the excitatory winding and $N_s$ turns for the sine winding, wherein $N_S > N_E$, for example $0.1 \times N_E < N_S < 100 \times N_E$, for example $0.5 \times N_E < N_S < 5 \times N_E$. For example, one or more of a second pole 1110P2 and a fourth pole 1110P4 each comprise the same number of turns as wound around the corresponding one or more first pole 1110P1 and third pole 1110P3. For example, each pole 1110P comprises 20 excitatory winding line turns, the first pole 1110P1 comprises 30 clockwise turns of the sine winding line 13110, the second pole 1110P2 comprises 30 clockwise turns of the cosine winding line 13120, the third pole 1110P3 comprises 30 anti-clockwise turns of the sine winding line 13110, and the fourth pole 1110P2 comprises 30 anti-clockwise turns of the cosine winding line 13120. For example, the length of the wire used for the sine winding line 13110 is the same as the length of the wire used for the cosine winding line 13110.

The position of the rotor 1200 of a resolver 1000 is, for example, measured by sending an alternating current, for example a sinusoidal electric current, into the excitatory winding line 13101, 12500 and measuring the relative magnitudes of signals, for example voltages, collected in the sensory windings, for example the sine winding line 13110 and the cosine winding line 13120.

FIG. 14 presents a method 14000 for manufacturing a stator 1100 and comprises, for example as computer-readable instructions stored on a non-volatile computer-readable storage device, the steps of: i) specifying 14010 the number of poles 1110P that the detector device comprises; ii) specifying 14020 the inter-pole gap 1115, for example as a function of the stator-rotor gap 1260; iii) computing 14030 one or more characteristic coordinates of the supporting line 3200, for example the angle of the supporting line 3200 with respect to the azimuthal plane, for example as a function of one or more of rotor height or desired flange height 5100 along the Z-axis and rotor radius; iv) computing 14040 one or more characteristic coordinates of the first flange contour portion 3110FP1 and of the second flange contour portion 3110FP2 of one or more flanges 1110F of one or more poles 1110P, for example coordinates in a {(p, Z} coordinates frame; v) storing 14050 the coordinates on a non-volatile computer-readable storage device; vi) reading 14060 one or more flange characteristic coordinates on the non-volatile computer-readable storage device using a computer-controlled manufacturing system; and vii) forming 14070 one or more flanges 1110F, for example forming one or more stators 1100 comprising one or more flanges 1110F, using the computer-controlled manufacturing system, for example using one or more of: an additive manufacturing system, a laser-cutting system, and a jet cutting system. For example, the assembly 1100 comprising the flanges 1110F, the teeth 1110T, and the stator ring 1101 is manufactured as a single part, for example using an additive manufacturing process. The method 14000 further comprises, for example, a step 14080 of forming one or more electrical windings 1110W onto one or more poles 1110P, for example teeth 1110T supporting a flange 1110F.

FIGS. 15A and 15B present side views of other examples 15101A, 15101B of stator embodiments of the resolver 1000 adapted to a rotor geometry comprising a surface of revolution comprising a first extremity with a radius that is larger than a second extremity, for example a truncated cone or, for another example, a truncated sphere, respectively. Correspondingly, the flanges 1110F (for example, three flanges 1110F1, 1110F2, 1110F3 of a four-flange stator are shown in FIGS. 15A, 15B) of the stator have a concave surface that corresponds to a portion of a surface of revolution matching that of the rotor comprising a first extremity 15201 with a radius that is larger than a second extremity 15202 with a radius of curvature greater than that of the rotor by a margin corresponding to that of the range of the air gap 1260, for example by a margin corresponding to the air gap where the rotor sector facing the flange 1110F has the largest radius. The contour of the flanges 1110F corresponds, for example, to a radial projection of the flanges 1110F of a cylindrical stator 1101, 6101, 7101, 8101, 11101 onto, for example, a truncated cone or a truncated sphere surface, respectively.

FIG. 16A presents a cross-section through the axis of rotation of an alternative embodiment for the rotor 1200: a multi-radius rotor 16200. The multi-radius rotor 16200 comprises a plurality of radii 16200R1, 16200R2, each radius corresponding to that of diametrically opposed rotor sectors 16201, 16202, respectively. For example, each diametrically opposed rotor sector 16201, 16202 extends azimuthally as the sector 1201, 1202 of embodiments described in FIGS. 1B, 1D, 2A, 5, 6, 7, 8A, 8B, 11A, and 12A: the azimuthal extent is that of one flange 1110F. For example, a multi-radius rotor 16200 comprises two pairs of diametrically opposed rotor sectors 16201, 16202. For example a first rotor sector 16201 has a radius 16200R1 that is smaller than that of a second rotor sector 16202 having a radius 16200R2. For example, an embodiment of a resolver 1000 that comprises eight poles 1110P that are uniformly arranged azimuthally comprises, for example, a multi-radius rotor 16200 that comprises two pairs of diametrically opposed rotor sectors 16201, 16202 of equal azimuthal span that are set apart azimuthally from each other by φ=90°, as shown in FIG. 16A. Rotating the multi-radius rotor 16200 provides a method to present steps of alternating magnetic permeability as each sector 16201, 16202 transits past a flange 1110F.

FIG. 16B presents an alternative embodiment 16200-2 of a multi-radius rotor 16200 that comprises two sectors 16201, 16202 of different radii. The two-sector rotor embodiment 16200-2 comprises two sectors each having, for example, an azimuthal span of 180°. An example embodiment of a resolver 1000 that comprises four flanges 1110F comprises, for example, a two-sector rotor embodiment 16200-2.

FIG. 16C presents an alternative embodiment 16200-6 of a multi-radius rotor 16200 that comprises six sectors 16201, 16202 of alternating radii 16200R1 and 16200R2. The multi-radius rotor 16200-6 comprises, for example, three pairs of diametrically opposed rotor sectors 16201, 16202, for example each rotor sector having an azimuthal span of 60°. An example embodiment of a resolver 1000 that comprises twelve flanges 1110F comprises, for example, a six-sector rotor embodiment 16200-6. A further example embodiment of a resolver 1000 comprises, for example, a multi-radius rotor 16200 with N rotor sectors 16201, 16202 and, for example, a stator with 2N flanges.

The invention claimed is:

1. An apparatus (1000) for detecting a rotation angle, comprising:
   an annular stator (1101) around an axis of revolution Z (1001), comprising:
   at least a first pole (1110P1), a second pole (1110P2), and a third pole (1110P3) arranged at constant azimuthal intervals around the axis of revolution (1001) of the annular stator (1101),
   each of the poles (1110P1, 1110P2, 1110P3) comprising one or more electrical windings (1110W), and
   each of the poles (1110P1, 1110P2, 1110P3) comprising a flange (1110F) that is a portion of a first surface of revolution around the annular stator's axis of revolution, the flange (1110F) having an area distribution substantially that, within a coordinate system (α; $z_\theta$), of a sin(α) function from a low α bound (1110E-0) of about 0 radians to a high α bound (1110E-180) of about π radians.

2. The apparatus according to claim 1, wherein a first set of the poles (1110P1, 1110P3) comprises a sine sensory winding line (13110) and a second remaining set of poles (1110P2, 1110P4) comprises a cosine sensory winding line (13120).

3. The apparatus according to claim 1, wherein each pole (1110P) comprises one or more excitatory windings (1110WE) coaxial with one or more sensory windings (1110WS).

4. The apparatus according to claim 1, wherein one or more of the pole's flanges (1110F) is delineated by at least the lines defined by:
   from α=0 to α=π/2 radians: $z_\theta$=0 and $z_\theta$=sin(α), and
   from α=π/2 to α=π radians: $z_\theta$=1−sin(α) and $z_\theta$=1.

5. The apparatus according to claim 1, wherein a high α bound (1110E-180) of the first pole's flange (1110F) and a low α bound (1110E-0) of the third pole's flange are aligned with the α=π/2 abscissa (1110FMA) of the second pole's flange's contours.

6. The apparatus according to claim 1, wherein the annular stator (1101) comprises four poles (1110P1, 1110P2, 1110P3, 1110P4).

7. The apparatus according to claim 1, wherein the flange (1110F) is sheared by a shear angle θ within a range [−π/4, π/4] radians with respect to a radial projection of the axis of revolution Z onto the first surface of revolution.

8. The apparatus according to claim 1, wherein the annular stator (1101) comprises one or more grooves (1140) into an external perimeter of the annular stator (1101), each groove comprising one or more winding wires (1150) of one or more electrical windings (1110W).

9. The apparatus according to claim 1, further comprising a rotor (1200).

10. The apparatus according to claim 1, further comprising a rotor (1200) that comprises a first rotor sector (1201) having a magnetic permeability that is different from that of an azimuthally adjacent second rotor sector (1202) and wherein the first rotor sector (1201) has an azimuthal extent that is about an azimuthal extent of one flange (1110F).

11. The apparatus according to claim 1, further comprising a rotor (1200) that comprises a first rotor sector (1201) comprising one or more strata (1251) of a material of magnetic permeability that is different from the magnetic permeability of material in an azimuthally-adjacent rotor sector (1202).

12. The apparatus according to claim 1, wherein, within the span of the flange (1110F) projected along the axis of revolution Z, the flange (1110F) masks the one or more electrical windings (1110WS, 1110WE) from the radial line-of-sight of the axis of revolution Z.

13. The apparatus according to claim 1, wherein the stator (1101) is an assembly of a plurality of stator sector components (1101-1, 1101-2, 1101-3, 1101-4).

14. The apparatus according to claim 1, wherein one or more of the first pole (1110P1), the second pole (1110P2), and the third pole (1110P3) comprise a hollow tooth (1110TA2).

15. The apparatus according to claim 1, further comprising a rotor (1200) characterized as having a first sector (1201) having a first magnetic permeability and a second sector (1202) having a second magnetic permeability that is different from the first magnetic permeability.

16. The apparatus according to claim 1, further comprising a rotor (1200) that comprises one or more layers (1251)

made of one or more non-magnetizable metals over a sector (1201) of azimuthal span corresponding the azimuthal extent of one flange (1110F).

17. The apparatus according to claim 1, further comprising a rotor (1200) that comprises one or more layers (1251) that comprise copper.

18. A method for forming an apparatus for detecting a rotation angle (1000) comprising
an annular stator (1101) around an axis of revolution Z (1001), comprising:
forming, in an additive three-dimensional process,
at least a first pole (1110P1), a second pole (1110P2), and a third pole (1110P3) arranged at constant azimuthal intervals around the axis of revolution (1001) of the annular stator (1101), and
each of the poles (1110P1, 1110P2, 1110P3) comprising a flange (1110F) that is a portion of a first surface of revolution around the annular stator's axis of revolution, the flange (1110F) having an area distribution substantially that, within a coordinate system ($\alpha$; $Z_\theta$), of a $\sin(\alpha)$ function from a low $\alpha$ bound (1110E-0) of about 0 radians to a high $\alpha$ bound (1110E-180) of about $\pi$ radians.

19. The method according to claim 18, further comprising forming one or more electrical windings (1110W) onto each pole (1110P1, 1110P2, 1110P3).

20. A method for measuring a rotation angle, comprising:
acquiring one or more signals from one or more electrical windings (1110W) of an annular stator (1101) around an axis of revolution Z (1001), the annular stator (1101) comprising:
at least a first pole (1110P1), a second pole (1110P2), and a third pole (1110P3) arranged at constant azimuthal intervals around the axis of revolution (1001) of the annular stator (1101),
each of the poles (1110P1, 1110P2, 1110P3) comprising one or more electrical windings (1110W), and
each of the poles (1110P1, 1110P2, 1110P3) comprising a flange (1110F) that is a portion of a first surface of revolution around the annular stator's axis of revolution, the flange (1110F) having an area distribution substantially that, within a coordinate system ($\alpha$; $Z_\theta$), of a $\sin(\alpha)$ function from a low $\alpha$ bound (1110E-0) of about 0 radians to a high $\alpha$ bound (1110E-180) of about $\pi$ radians.

* * * * *